US008411954B2

(12) United States Patent
Takagi et al.

(10) Patent No.: US 8,411,954 B2
(45) Date of Patent: Apr. 2, 2013

(54) IMAGE PROCESSING SYSTEM, IMAGE PROCESSING PROGRAM, AND IMAGE PROCESSING METHOD

(75) Inventors: Atsushi Takagi, Toyota (JP); Shinsuke Sato, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1133 days.

(21) Appl. No.: 12/306,547

(22) PCT Filed: Jun. 28, 2007

(86) PCT No.: PCT/IB2007/001769
§ 371 (c)(1),
(2), (4) Date: Dec. 24, 2008

(87) PCT Pub. No.: WO2008/001207

PCT Pub. Date: Jan. 3, 2008

(65) Prior Publication Data
US 2009/0310864 A1    Dec. 17, 2009

(30) Foreign Application Priority Data
Jun. 29, 2006 (JP) ................................. 2006-180465

(51) Int. Cl.
G06K 9/00 (2006.01)
(52) U.S. Cl. ........................................ 382/181; 382/302
(58) Field of Classification Search .................. 382/181, 382/302
See application file for complete search history.

(56) References Cited

U.S. PATENT DOCUMENTS

| 5,513,275 | A  | * | 4/1996 | Khalaj et al. | ................... 382/149 |
| 6,181,816 | B1 | * | 1/2001 | Adams et al. | ................... 382/162 |
| 6,678,404 | B1 | * | 1/2004 | Lee et al. | ....................... 382/155 |
| 8,126,259 | B2 | * | 2/2012 | Shimura | ........................ 382/149 |
| 2004/0126003 | A1 | * | 7/2004 | Isomura et al. | ................ 382/141 |
| 2006/0171593 | A1 | * | 8/2006 | Hayakawa et al. | ............ 382/209 |

(Continued)

FOREIGN PATENT DOCUMENTS

| JP | 7-168551 | 7/1995 |
| JP | 2002-198406 | 7/2002 |

OTHER PUBLICATIONS

I. Tumer et al., "Investigation of Characteristic Measures for the Analysis and Synthesis of Precision-Machined Surfaces," Journal of Manufacturing Systems, vol. 14, No. 5, pp. 378-392 (1995).
J. Zhang, "Brief Review of Invariant Texture Analysis Methods," Pattern Recognition, vol. 35, pp. 735-747 (2002).
C. Chen et al., "Texture Synthesis: A Review and Experiments," Journal of Information Science and Engineering, vol. 19, pp. 371-380 (2003).

*Primary Examiner* — Jingge Wu
(74) *Attorney, Agent, or Firm* — Finnegan, Henderson, Farabow, Garrett & Dunner, LLP

(57) ABSTRACT

It is determined whether a repeating pattern is present in an image (100). When no repeating pattern is present, the image is divided into patch images, the resultant patch images are used to create a random repeating pattern, and the random repeating pattern is output (108). In addition, when the number of repetitions of the repeating pattern in the image is 2×2 or more (102), the repetition period is determined by transforming pixel values into frequency coefficients, and the repeating pattern is extracted based on the result of determining the repetition period, and is output (104). When the number of repetitions of the repeating pattern in the image is less than 2×2, the repetition period is determined by performing division using local maximum values of autocorrelation coefficients, and the repetition pattern is extracted based on the result of determining the repetition period (106).

7 Claims, 26 Drawing Sheets

U.S. PATENT DOCUMENTS

| | | | |
|---|---|---|---|
| 2006/0280358 A1* | 12/2006 | Ishikawa | 382/149 |
| 2007/0127806 A1* | 6/2007 | Tsuchiya et al. | 382/144 |
| 2008/0279445 A1* | 11/2008 | Matsui et al. | 382/149 |
| 2009/0041335 A1* | 2/2009 | Matsui et al. | 382/149 |
| 2009/0290784 A1* | 11/2009 | Lin et al. | 382/149 |
| 2010/0053319 A1* | 3/2010 | Sakai et al. | 348/125 |
| 2012/0076396 A1* | 3/2012 | Sakai et al. | 382/145 |

* cited by examiner

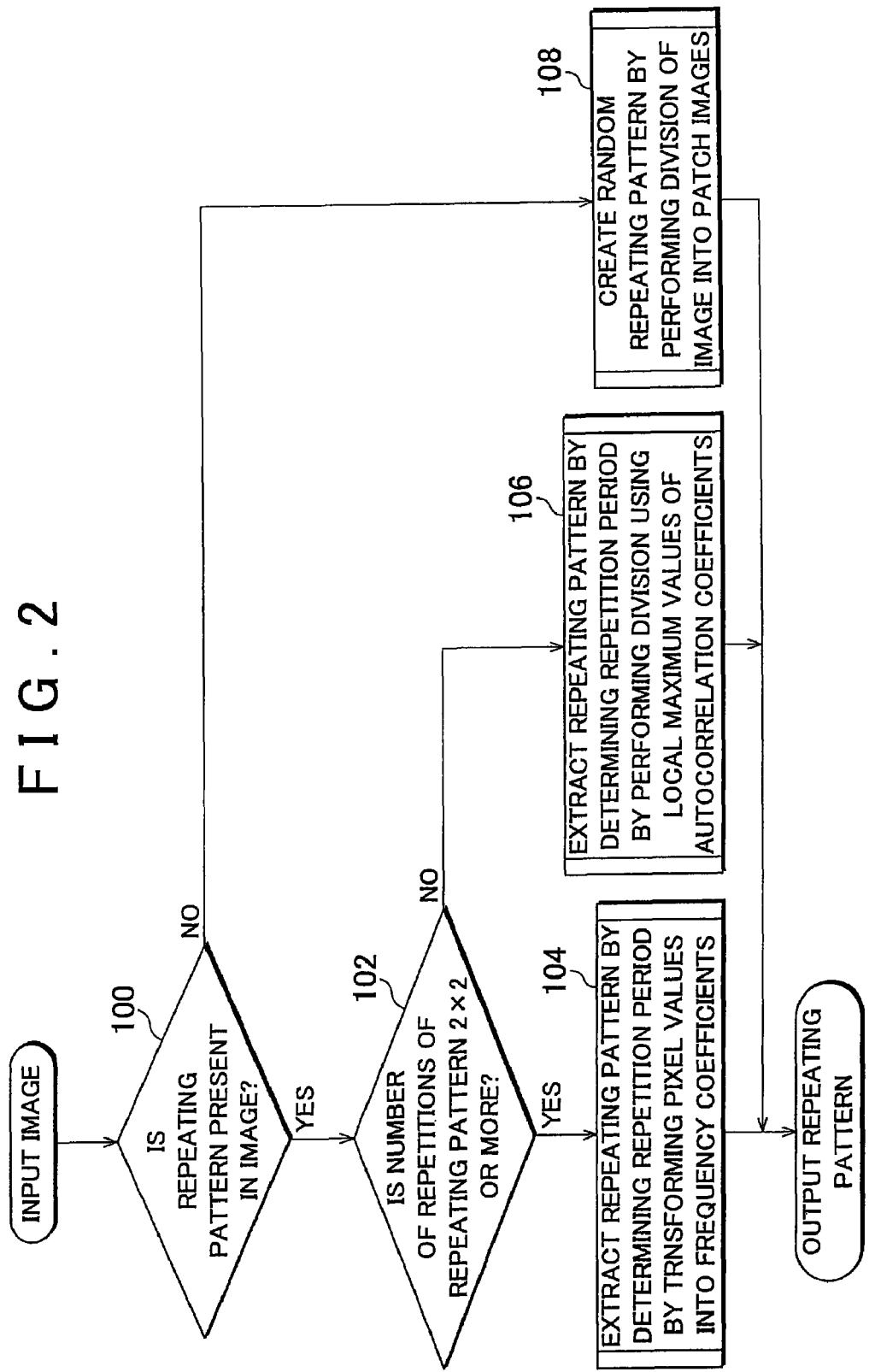

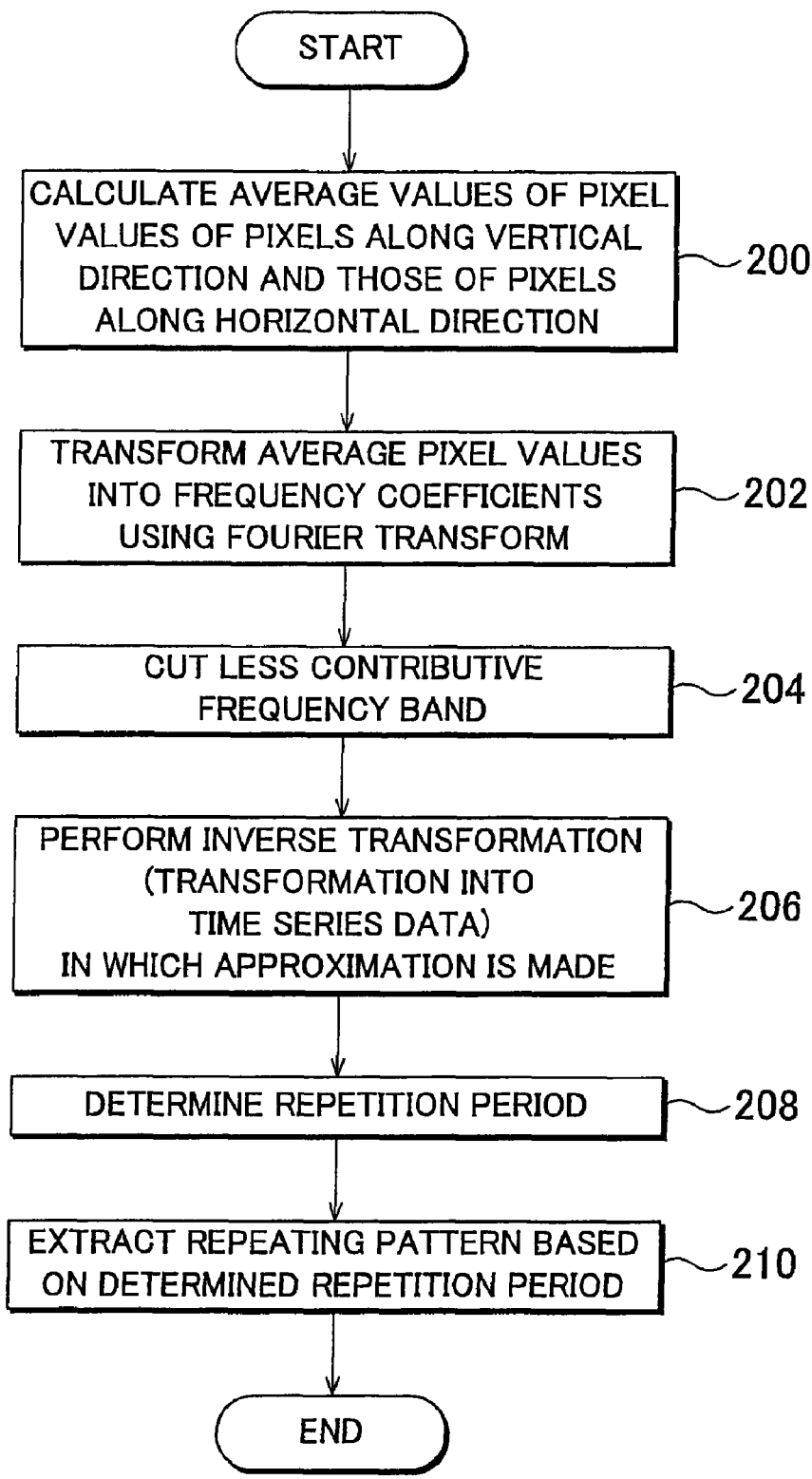

PIXEL HAVING COORDINATES AT WHICH SQUARE ERROR IS MINIMUM IN UPPER EDGE PORTION

PIXEL HAVING COORDINATES AT WHICH SQUARE ERROR IS MINIMUM IN LEFT EDGE PORTION

▤ PIXEL HAVING COORDINATES AT WHICH SQUARE ERROR IS MINIMUM

▥ PIXEL HAVING COORDINATES AT WHICH SQUARE ERROR IS MINIMUM

FIG. 23A  FIG. 23B
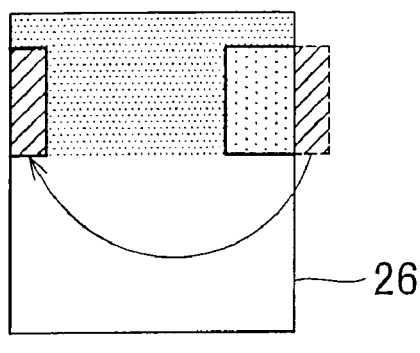
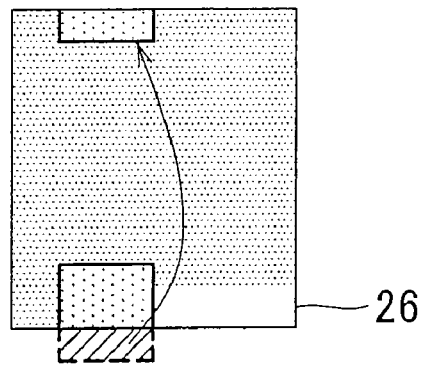
FIG. 23C
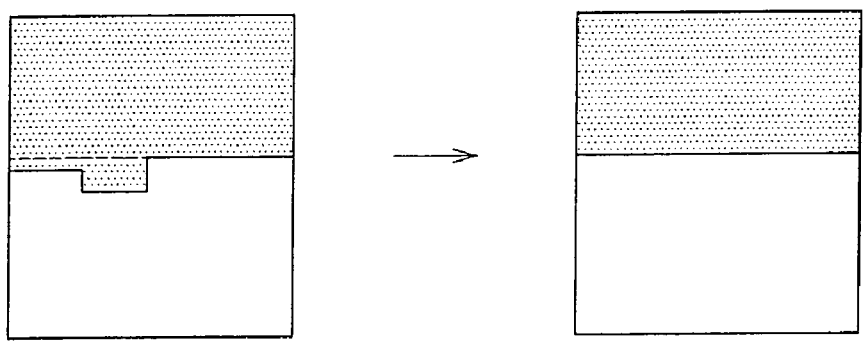

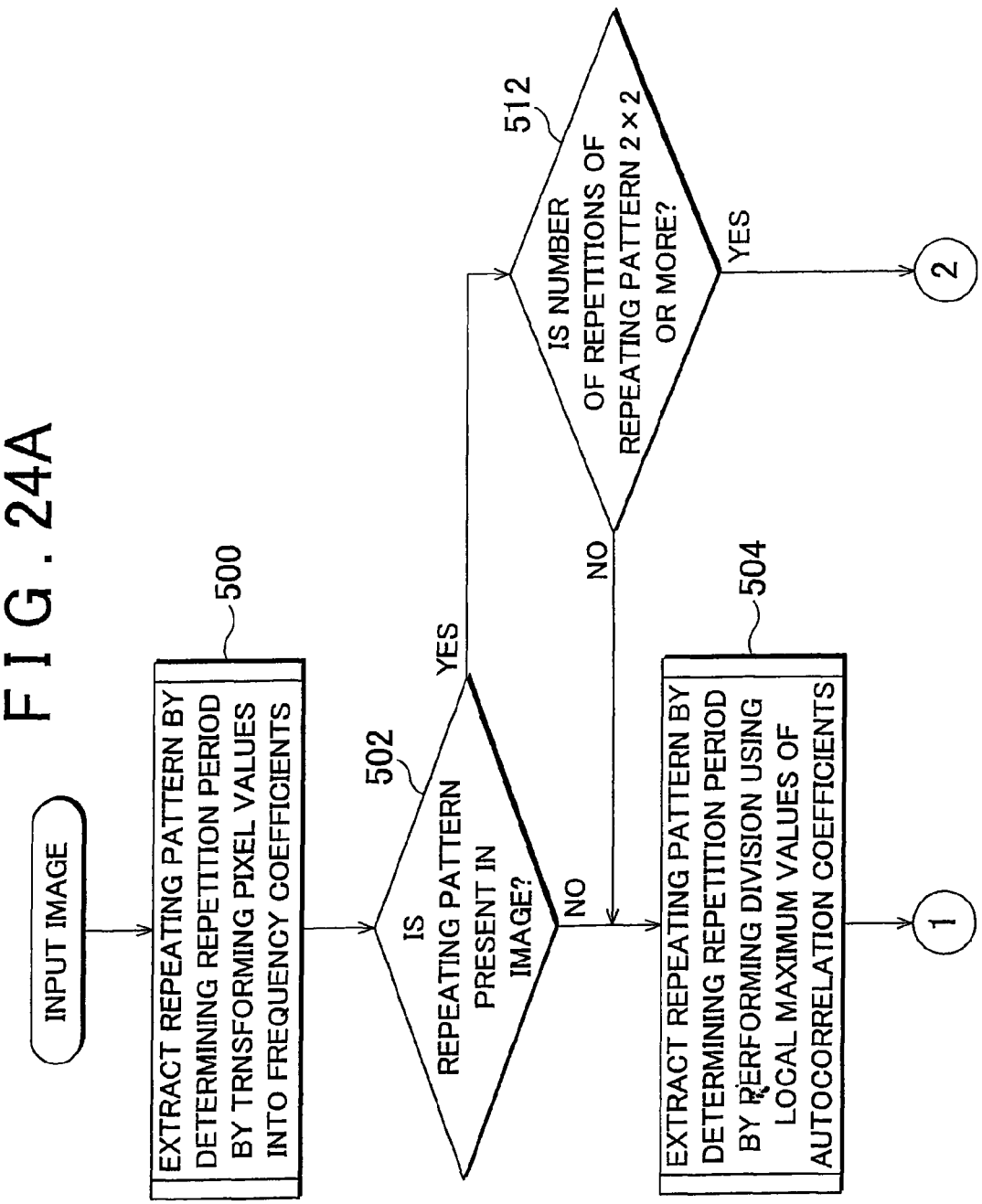

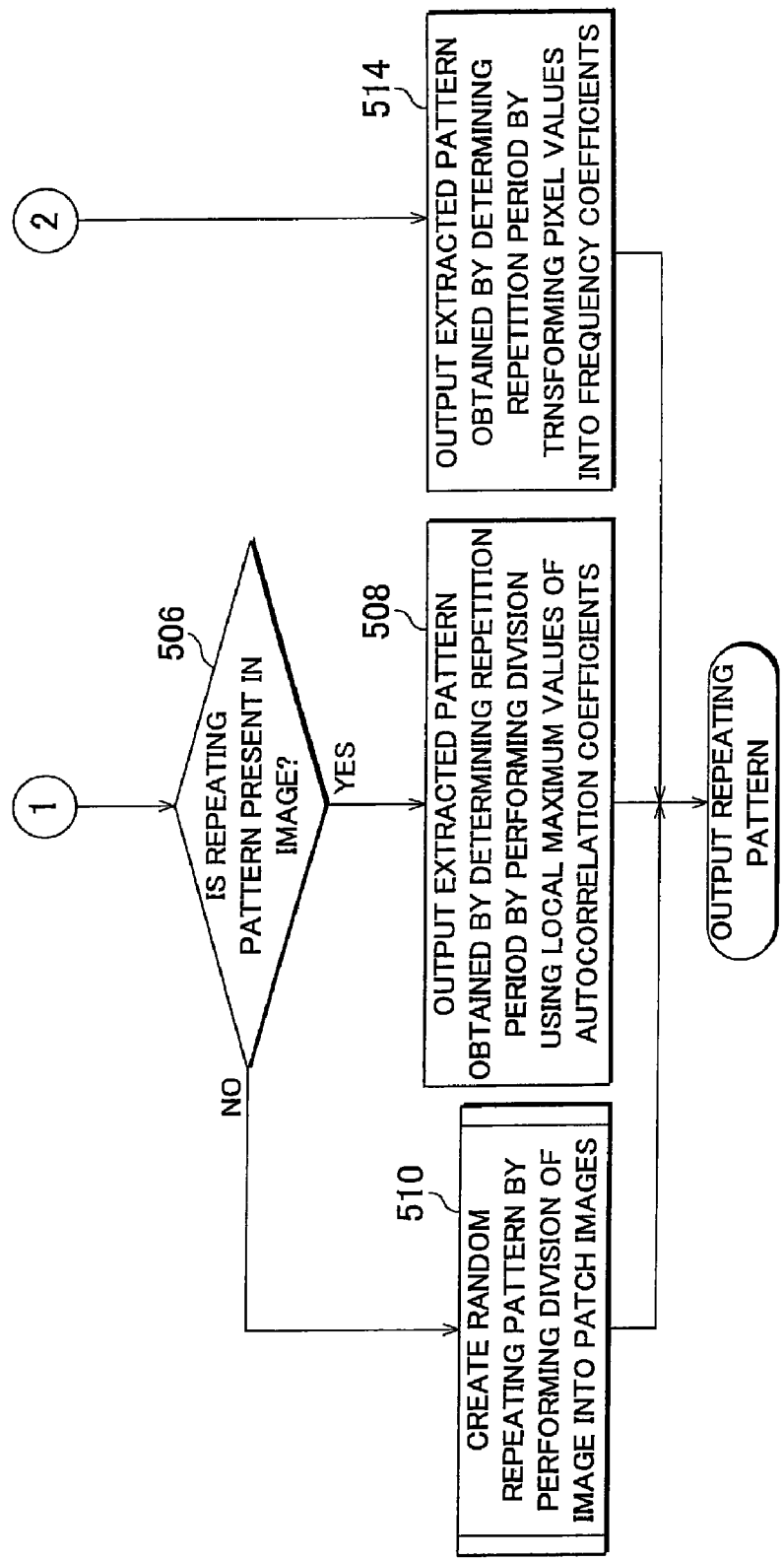

IMAGE PROCESSING SYSTEM, IMAGE PROCESSING PROGRAM, AND IMAGE PROCESSING METHOD

CROSS-REFERENCE TO RELATED APPLICATIONS

This application is a national phase application of International Application No. PCT/IB2007/001769, filed Jun. 28, 2007, and claims the priority of Japanese Application No. 2006-180465, filed Jun. 29, 2006, the contents of both of which are incorporated herein by reference.

BACKGROUND OF THE INVENTION

1. Field of the Invention

The present invention relates to an image processing system, an image processing program, and an image processing method. More specifically, the present invention relates to an image processing system, an image processing program, and an image processing method, which accurately extract a repeating pattern present in an image.

2. Description of the Related Art

A method of applying an image to an object, which is so-called texture mapping, is widely known in the field of computer graphics (hereinafter referred to as CG), and is used on a variety of CG systems.

In order to enhance reality, a pattern is repeatedly applied to an object in some cases. However, if consideration is not given to such repetition, the seam portion between the patterns can be unnatural, and reality can be reduced.

When a repeating pattern in an image is extracted or created, the work can be done manually using an image editing software. However, when the pattern is complicated, a large amount of time is needed.

As an example of a method of extracting a repeating pattern in an image, there has been proposed the technique described in Japanese Patent Application Publication No. 2002-198406 (JP-A-2002-198406), for example.

The technique described in JP-A-2002-198406 describes that, using a mathematical technique, such as Fourier transform or an autocorrelation function, a repetition pitch of the repeating patterns is derived from the image that is obtained by imaging an object via an image pickup element, and the region having the repetition pitch is regarded as a region containing a repeating pattern.

However, although, with regard to the technology described in JP-A-2002-198406, it is described that the repetition pitch is derived using a mathematical technique, there is no description of a specific method of calculating the period, and therefore this technology is lacking in feasibility.

An object of the present invention is to accurately extract a repeating pattern.

SUMMARY OF THE INVENTION

An image processing system according to a first aspect of the present invention includes: a plurality of means for extracting a repeating pattern, which use mutually different methods of determining a repetition period used when extracting the repeating pattern contained in an image; and a means for performing switching between the plurality of repeating pattern-extracting means according to the number of repetitions of the repeating pattern contained in the image.

According to the first aspect of the present invention, one of the plurality of means for extracting a repeating pattern extracts a repeating pattern contained in the image. The plurality of repeating pattern-extracting means use mutually different, respective methods of determining the repetition period used when the repeating pattern is extracted. For example, the image processing system may include a plurality of means for extracting a repeating pattern that have mutually different extraction accuracies, depending on the number of repetitions of the repeating pattern.

The switching means performs switching between the repeating pattern-extracting means depending on the number of repetitions of the repeating pattern contained in the image. Specifically, it is possible to extract a repeating pattern using an optimal extracting means adapted to the number of repetitions of the repeating pattern. Accordingly, it is possible to accurately extract a repeating pattern from the image input into the image processing system.

The image processing system may further include a means for creating an arbitrary repeating pattern, wherein, when no repeating pattern is contained in the image, the creating means creates the arbitrary repeating pattern.

The plurality of repeating pattern-extracting means may include: a first extracting means for extracting the repeating pattern by determining a repetition period of the repeating pattern in the image by transforming pixel values in the image into frequency coefficients; and a second extracting means for extracting the repeating pattern by: constructing an image pyramid that is constructed as a set of images with different resolutions, from a high resolution image to a low resolution image; calculating a higher order local autocorrelation feature value at each pixel of a deepest layer image of the image pyramid to calculate an autocorrelation coefficient between a reference pixel area and each subject pixel area based on the calculated, higher order local autocorrelation feature values; performing such calculation of higher order local autocorrelation feature values and autocorrelation coefficients for an image of a layer that is shallower by one level than the layer of the preceding calculation, wherein, in each repetition, the calculation is performed for every subject pixel area of the current layer that corresponds to the subject pixel area whose autocorrelation coefficient was a local maximum value in the image of the layer that is deeper by one level than the layer of the current layer; repeating the preceding calculation step a predetermined number of times; and using a local maximum value of autocorrelation coefficients of a shallowest layer to determine the repetition period of the repeating pattern in the image.

An image processing system according to a second aspect of the present invention includes: a first extracting means for extracting a repeating pattern from an image by determining a repetition period of the repeating pattern in the image by transforming pixel values in the image into frequency coefficients; a second extracting means for extracting the repeating pattern by: constructing an image pyramid that is constructed as a set of images with different resolutions, from a high resolution image to a low resolution image; calculating a higher order local autocorrelation feature value at each pixel of a deepest layer image of the image pyramid to calculate an autocorrelation coefficient between a reference pixel area and each subject pixel area based on the calculated, higher order local autocorrelation feature values; performing such calculation of higher order local autocorrelation feature values and autocorrelation coefficients for an image of a layer that is shallower by one level than the layer of the preceding calculation, wherein, in each repetition, the calculation is performed for every subject pixel area of the current layer that corresponds to the subject pixel area whose autocorrelation coefficient was a local maximum value in the image of the layer that is deeper by one level than the layer of the current layer; repeating the preceding calculation step a predetermined number of times; and using a local maximum value of autocorrelation coefficients of a shallowest layer to determine the repetition period of the repeating pattern in the image; and a means for creating an arbitrary repeating pattern. When a repeating pattern whose number of repetitions is equal to or greater than a predetermined number is extracted as a result of extraction of a repeating pattern by the first extracting means, the repeating pattern extracted by the first extracting means is output. When no repeating pattern is extracted by the first extracting means, or when no repeating pattern whose number of repetitions is equal to or greater than the predetermined number is extracted by the first extracting means, extraction of a repeating pattern is performed by the second extraction means. If a repeating pattern is extracted by the second extraction means, the repeating pattern is output. If no repeating pattern is extracted by the second extracting means, the arbitrary repeating pattern is created by the creating means and output.

According to the image processing system according to the second aspect, the first extracting means extracts a repeating pattern in an image by determining a repetition period of the repeating pattern in the image by transforming pixel values in the image into frequency coefficients. The second extracting means extracts the repeating pattern by: constructing an image pyramid that is constructed as a set of images with different resolutions, from a high resolution image to a low resolution image; calculating a higher order local autocorrelation feature value at each pixel of a deepest layer image of the image pyramid to calculate an autocorrelation coefficient between a reference pixel area and each subject pixel area based on the calculated, higher order local autocorrelation feature values; performing such calculation of higher order local autocorrelation feature values and autocorrelation coefficients for an image of a layer that is shallower by one level than the layer of the preceding calculation, wherein, in each repetition, the calculation is performed for every subject pixel area of the current layer that corresponds to the subject pixel area whose autocorrelation coefficient was a local maximum value in the image of the layer that is deeper by one level than the layer of the current layer; repeating the preceding calculation step a predetermined number of times; and using a local maximum value of autocorrelation coefficients of a shallowest layer to determine the repetition period of the repeating pattern in the image. The creating means creates an arbitrary repeating pattern.

When a repeating pattern whose number of repetitions is equal to or greater than a predetermined number is extracted as a result of extraction of a repeating pattern by the first extracting means, the repeating pattern extracted by the first extracting means is output. When no repeating pattern is extracted by the first extracting means, or when no repeating pattern whose number of repetitions is equal to or greater than the predetermined number is extracted by the first extracting means, extraction of a repeating pattern is performed by the second extraction means. If a repeating pattern is extracted by the second extraction means, the repeating pattern is output. If no repeating pattern is extracted by the second extracting means, an arbitrary repeating pattern is created by the creating means and output. Thus, it is possible to accurately extract a repeating pattern from the image input into the image processing system. In addition, with this configuration, it is made possible to automatically extract a repeating pattern from the image input into the image processing system.

An image processing program according to a third aspect of the present invention is an image processing program that causes a computer to perform the following image-processing process. The image-processing process includes: a plurality of steps of extracting a repeating pattern, which use mutually different methods of determining a repetition period used when extracting the repeating pattern contained in an image; and a switching step of performing switching between the plurality of repeating pattern-extracting steps according to the number of repetitions of the repeating pattern contained in the image.

According to the image processing program according to the third aspect, the plurality of repeating pattern-extracting steps extract a repeating pattern contained in the image. The plurality of repeating pattern-extracting steps use mutually different methods of determining the repetition period that are used to extract the repeating pattern. The image processing process may include a plurality of steps of extracting the repeating pattern, the steps having mutually different extraction accuracies depending on the number of repetitions of the repeating pattern.

The switching step performs switching between the repeating pattern-extracting means according to the number of repetitions of the repeating pattern in the image. Because it is possible to extract a repeating pattern using an optimal extracting step adapted to the number of repetitions of the repeating pattern. Accordingly, it is possible to accurately extract a repeating pattern from the image input into the image processing system.

The image processing process may further include a creation step of creating an arbitrary repeating pattern, wherein, when no repeating pattern is contained in the image, the creating step creates the arbitrary repeating pattern.

For example, the plurality of repeating pattern-extracting steps may include: a first extracting step of extracting the repeating pattern by determining a repetition period of the repeating pattern in the image by transforming pixel values in the image into frequency coefficients; and a second extracting step of extracting the repeating pattern by: constructing an image pyramid that is constructed as a set of images with different resolutions, from a high resolution image to a low resolution image; calculating a higher order local autocorrelation feature value at each pixel of a deepest layer image of the image pyramid to calculate an autocorrelation coefficient between a reference pixel area and each subject pixel area based on the calculated, higher order local autocorrelation feature values; performing such calculation of higher order local autocorrelation feature values and autocorrelation coefficients for an image of a layer that is shallower by one level than the layer of the preceding calculation, wherein, in each repetition, the calculation is performed for every subject pixel area of the current layer that corresponds to the subject pixel area whose autocorrelation coefficient was a local maximum value in the image of the layer that is deeper by one level than the layer of the current layer; repeating the preceding calculation step a predetermined number of times; and using a local maximum value of autocorrelation coefficients of a shallowest layer to determine the repetition period of the repeating pattern in the image.

An image processing program according to a fourth aspect of the present invention is an image processing program that causes a computer to perform the following image-processing process. The image-processing process includes: a first extracting step of extracting a repeating pattern from an image by determining a repetition period of the repeating pattern in the image by transforming pixel values in the image into frequency coefficients; a second extracting step of extracting the repeating pattern by: constructing an image pyramid that is constructed as a set of images with different resolutions, from a high resolution image to a low resolution image; calculating a higher order local autocorrelation feature value at each pixel of a deepest layer image of the image pyramid to calculate an autocorrelation coefficient between a reference pixel area and each subject pixel area based on the calculated, higher order local autocorrelation feature values; performing such calculation of higher order local autocorrelation feature values and autocorrelation coefficients for an image of a layer that is shallower by one level than the layer of the preceding calculation, wherein, in each repetition, the calculation is performed for every subject pixel area of the current layer that corresponds to the subject pixel area whose autocorrelation coefficient was a local maximum value in the image of the layer that is deeper by one level than the layer of the current layer; repeating the preceding calculation step a predetermined number of times; and using a local maximum value of autocorrelation coefficients of a shallowest layer to determine the repetition period of the repeating pattern in the image; and a creating step of creating an arbitrary repeating pattern. When a repeating pattern whose number of repetitions is equal to or greater than a predetermined number is extracted as a result of extraction of a repeating pattern in the first extracting step, the repeating pattern extracted is output. When no repeating pattern is extracted in the first extracting step, or when no repeating pattern whose number of repetitions is equal to or greater than the predetermined number is extracted in the first extracting step, extraction of a repeating pattern is performed in the second extraction step. If a repeating pattern is extracted in the second extraction step, the repeating pattern is output. If no repeating pattern is extracted in the second extracting step, the arbitrary repeating pattern is created in the creating step and output.

According to the fourth aspect, the first extracting step extracts a repeating pattern in an image by determining a repetition period of the repeating pattern in the image by transforming pixel values in the image into frequency coefficients. The second extracting step extracts the repeating pattern by: constructing an image pyramid that is constructed as a set of images with different resolutions, from a high resolution image to a low resolution image; calculating a higher order local autocorrelation feature value at each pixel of a deepest layer image of the image pyramid to calculate an autocorrelation coefficient between a reference pixel area and each subject pixel area based on the calculated, higher order local autocorrelation feature values; performing such calculation of higher order local autocorrelation feature values and autocorrelation coefficients for an image of a layer that is shallower by one level than the layer of the preceding calculation, wherein, in each repetition, the calculation is performed for every subject pixel area of the current layer that corresponds to the subject pixel area whose autocorrelation coefficient was a local maximum value in the image of the layer that is deeper by one level than the layer of the current layer; repeating the preceding calculation step a predetermined number of times; and using a local maximum value of autocorrelation coefficients of a shallowest layer to determine the repetition period of the repeating pattern in the image. The creating step creates an arbitrary repeating pattern.

When a repeating pattern whose number of repetitions is equal to or greater than a predetermined number is extracted as a result of extraction of a repeating pattern in the first extracting step, the repeating pattern extracted in the first extracting step is output. When no repeating pattern is extracted in the first extracting step, or when no repeating pattern whose number of repetitions is equal to or greater than the predetermined number is extracted in the first extracting step, extraction of a repeating pattern is performed in the second extraction step. If a repeating pattern is extracted in the second extraction step, the repeating pattern is output. If no repeating pattern is extracted in the second extracting step, an arbitrary repeating pattern is created in the creating step and output. Thus, it is possible to accurately extract a repeating pattern from the image input into the image processing system. In addition, by performing such a process, it is made possible to automatically extract a repeating pattern from the image input into the image processing system.

An image processing method according to a fifth aspect of the present invention includes: performing a first extraction in which a repeating pattern is extracted from an image by determining a repetition period of the repeating pattern in the image by transforming pixel values in the image into frequency coefficients; when a repeating pattern whose number of repetitions is equal to or greater than a predetermined number is extracted in the first extraction, outputting the repeating pattern extracted in the first extraction; when no repeating pattern is extracted in the first extraction, or when no repeating pattern whose number of repetitions is equal to or greater than the predetermined number is extracted in the first extraction, performing second extraction in which a repeating pattern is extracted by: constructing an image pyramid; calculating a higher order local autocorrelation feature value at each pixel of a deepest layer image of the image pyramid to calculate an autocorrelation coefficient between a reference pixel area and each subject pixel area based on the calculated, higher order local autocorrelation feature values; performing such calculation of higher order local autocorrelation feature values and autocorrelation coefficients for an image of a layer that is shallower by one level than the layer of the preceding calculation, wherein, in each repetition, the calculation is performed for every subject pixel area of the current layer that corresponds to the subject pixel area whose autocorrelation coefficient was a local maximum value in the image of the layer that is deeper by one level than the layer of the current layer; repeating the preceding calculation step a predetermined number of times; and using a local maximum value of autocorrelation coefficients of a shallowest layer to determine the repetition period of the repeating pattern in the image; if a repeating pattern is extracted in the second extraction, outputting the repeating pattern extracted in the second extraction; and if no repeating pattern is extracted in either the first extraction or the second extraction, creating an arbitrary repeating pattern.

According to the image processing method according to the fifth aspect of the present invention, there is an advantage that it is possible to accurately extract a repeating pattern from an image by performing switching between a plurality of repeating pattern-extracting processes according to the number of repetitions of the repeating pattern in the image, the plurality of repeating pattern-extracting processes using mutually different methods of determining the repetition period used when the repeating pattern contained in the image is extracted.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 2 is a flow chart showing an example of a flow of a process including an extraction process and a creation process that are performed by the image processing system according to the embodiment of the present invention;

FIG. 3 is a flow chart for explaining a method of determining a repetition period by transforming pixel values into frequency coefficients;

FIG. 23A is a diagram for explaining a case where a patch image to be combined extends beyond the right edge of the seamless image;

FIG. 23B is a diagram for explaining a case where a patch image to be combined extends beyond the lower edge of the seamless image;

FIG. 23C is a diagram for explaining a process in which the completion line is set at the horizontal line corresponding to the minimum vertical coordinate; and FIGS. 24A and 24B are flow charts showing an example of a flow of a process including the above-described extraction and creation processes performed by an image processing system of a modification.

DETAILED DESCRIPTION OF THE PREFERRED EMBODIMENTS

Figure 1A:
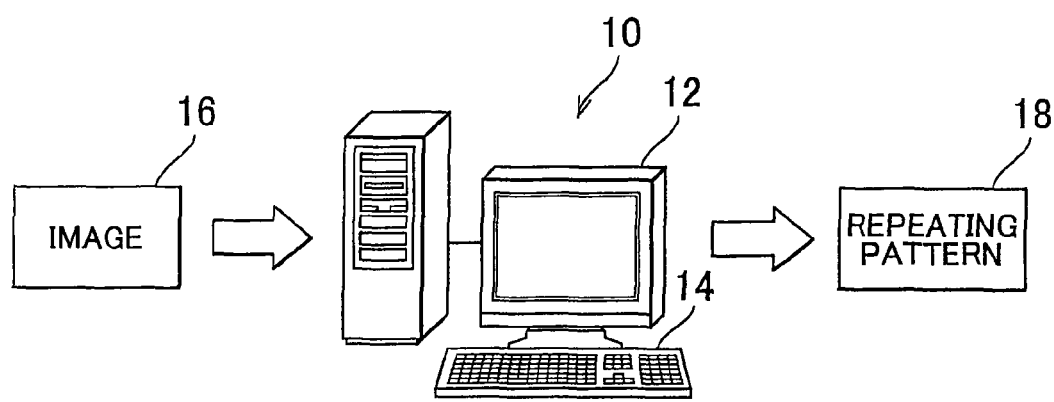
FIGS. 1A and 1B are diagrams for explaining the outline of an image processing system according to an embodiment of the present invention.

An example embodiment of the present invention will be described in detail below with reference to the drawings. FIG. 1 is a diagram for explaining the outline of an image processing system according to the embodiment of the present invention.

Figure 1B:
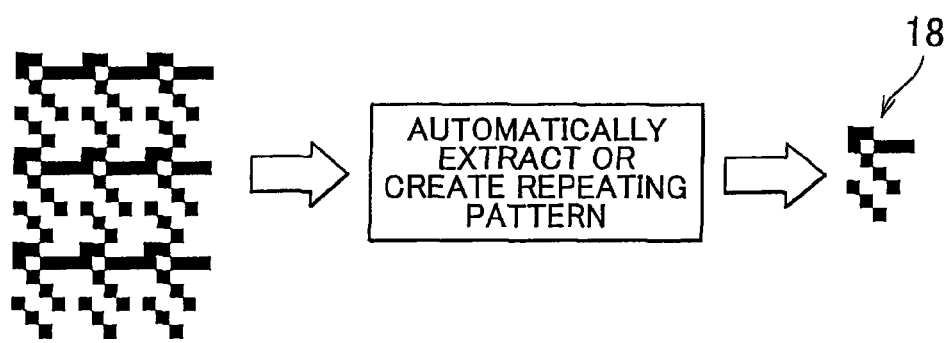

As shown in FIG. 1, the image processing system 10 according to the embodiment of the present invention is constituted of a common personal computer or the like, which includes a display means, such as a monitor 12, and an input means, such as a keyboard 14 and a mouse or the like. The image processing system 10 extracts a repeating pattern present in an input image 16, or creates a repeating pattern using the input image 16, and outputs the repeating pattern. Specifically, when an image as shown in FIG. 1B is input, the image processing system 10 automatically extracts a repeating pattern 18 present in the image, or creates a repeating pattern adapted to the image, and outputs the repeating pattern.

When a repeating pattern is present in the input image, the image processing system 10 according to the embodiment of the present invention performs an extraction process of extracting the repeating pattern from the input image. When no repeating pattern is present in the input image, the image processing system 10 performs a creation process of creating the repeating pattern using the input image 16.

The image processing system 10 determines whether to perform the extraction process or to perform the creation process based on the input provided via the keyboard 14. First, an operator checks the image displayed on the monitor 12, and inputs the check result into the image processing system 10 by the keyboard 14. Then, the image processing system 10 determines whether a repeating pattern is present in the input image based on the check result input via the keyboard 14. Then, the image processing system 10 determines whether to perform the extraction process or to perform the creation process.

There are two kinds of extraction processes performed in the image processing system 10. The extraction process performed is different depending on whether the number of repetitions of the repeating pattern in the input image is 2×2 or more. When the operator checks the image displayed on the monitor 12, and inputs the check result into the image processing system 10 by the keyboard 14, the image processing system 10 determines whether the number of repetitions of the repeating pattern in the input image is 2×2 or more based on the check result input via the keyboard 14 to select the extraction process to be performed out of two kinds of extraction processes.

In this embodiment, when the number of repetitions of the repeating pattern in the input image is 2×2 or more, the repeating pattern is extracted by determining the cycle of the repeating pattern by transforming the pixel values into frequency coefficients. When the number of repetitions of the repeating pattern in the input image is less than 2×2, the repeating pattern is extracted by determining the repetition period by performing division using local maximum values of the autocorrelation coefficients. Hence, two kinds of extraction processes performed by the image processing system 10 are different in the method of determining the repetition period. Details of the repetition period-determining method of each of two kinds of extraction processes will be described later.

When the creation process of creating a repeating pattern is performed, the image processing system 10 divides the input image into prescribed patch images, and randomly arranges patch images having similarity to create a repeating pattern. Details of the method of creating a random repeating pattern by dividing the image into patch images will also be described later.

Next, the processes performed by the image processing system 10 according to the embodiment of the present invention configured as described above will be described. FIG. 2 is a flow chart showing an example of the flow of the process including the above-described extraction and creation processes performed by the image processing system 10 according to the embodiment of the present invention.

First, in step 100, it is determined whether a repeating pattern is present in the input image. The determination is made based on the input result (the result of checking whether a repeating pattern is present in the input image) that an operator inputs via the keyboard 14 after viewing the image displayed on the monitor 12. When the determination is positive, the process proceeds to step 102.

In step 102, it is determined whether the number of repetitions of the repeating pattern in the image is 2×2 or more. This determination is also made based on the input result (the result of checking whether the number of repetitions of the repeating pattern in the input image is 2×2 or more) that the operator inputs via the keyboard 14 after viewing the image displayed on the monitor 12. When the determination is positive, the process proceeds to step 104. When the determination is negative, the process proceeds to step 106.

In step 104, a repeating pattern is extracted based on the result of determining the repetition period by transforming pixel values into frequency coefficients as described above, and the repeating pattern is output.

In step 106, a repeating pattern is extracted based on the result of determining the repetition period by performing division using local maximum values of the autocorrelation coefficients as described above, and the repeating pattern is output.

On the other hand, when the determination in step 100 is negative, that is, when it is determined that no repeating pattern is present in the input image, the process proceeds to step 108. In step 108, the above image is divided into patch images, the resultant patch images are used to create a random repeating pattern, and the created repeating pattern is then output.

In this embodiment, performing processing in this way makes it possible to automatically extract or create a repeating pattern from an input image just by inputting the result of checking whether a repeating pattern is present in the input image, and inputting the result of checking whether the number of repetitions of the repeating pattern is 2×2 or more. In addition, because the extraction method is switched according to the presence and the number of repetitions of the repeating pattern, it is possible to accurately extract the repeating pattern.

Although, with regard to this embodiment, an operator inputs, via the keyboard, whether a repeating pattern is present, and the image processing system creates a repeating pattern when no repeating pattern is present, the present invention is not limited to this embodiment. For example, creation of a repeating pattern in step 108 may be performed when no repeating pattern is extracted in either of steps 104 and 106.

Two kinds of methods of determining a repetition period will now be described in detail. First, a method of determining a repetition period by transforming pixel values into frequency coefficients will be described. FIG. 3 is a flow chart for explaining the method of determining a repetition period by transforming pixel values into frequency coefficients.

Figure 4:
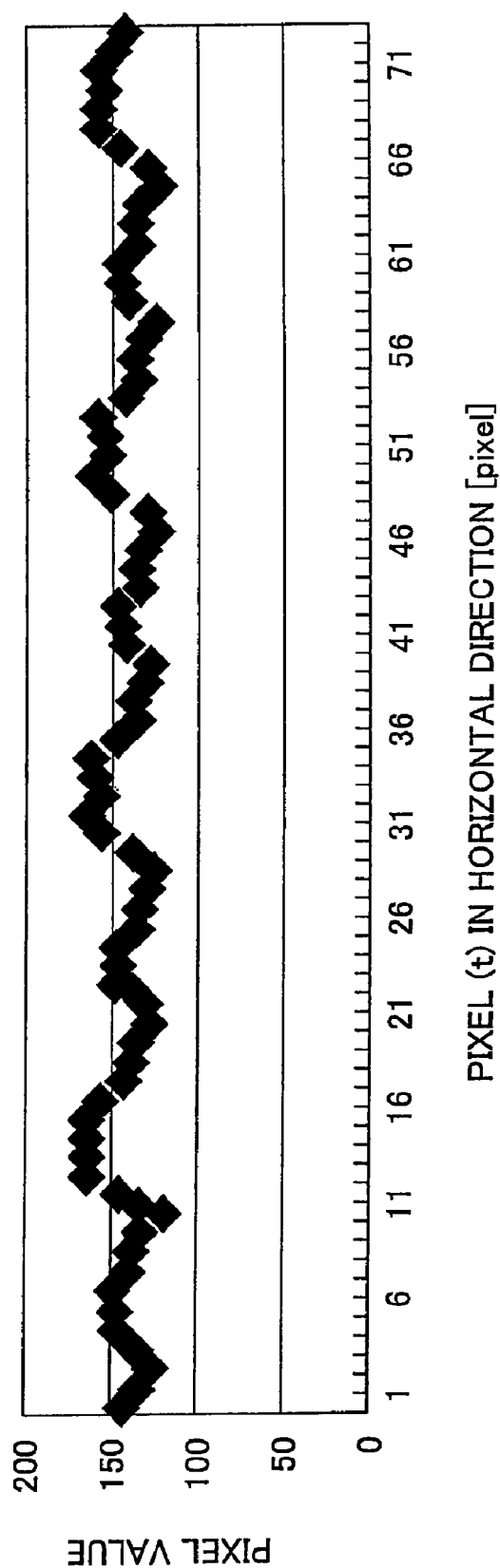
FIG. 4 is a diagram showing a result of calculating the averages of the pixel values of the pixels along the vertical direction of a sample image.

In step 200, average values of the pixel values in the vertical direction and the horizontal direction of the input image are individually calculated, and the process proceeds to step 202. The calculation of the average values of the pixel values in the vertical direction and the horizontal direction is performed after the input image is converted to a gray scale image. As an example, a result of calculating the average values of the pixel values of the pixels along the vertical direction of the sample image is shown in FIG. 4. Steps 202 to 208 described below are performed for each of the vertical direction and the horizontal direction. However, the following description will be given of only the case of the vertical direction by way of illustration.

In step 202, the average pixel values are transformed into frequency coefficients using Fourier transform. A Fourier transform is an expression that shows how a time-domain function is transformed into a frequency-domain function. For example, when certain time-series data $\{f(t): t=1, \ldots, N\}$ are given (pixel values in this case), the discrete Fourier transform formula is as follows.

$$\tau(\omega) = \frac{1}{N}\sum_{t=0}^{N-1} f(t) * e^{i2\pi\omega t/N} \qquad \text{(Expression 1)}$$

$$= \frac{1}{N}\sum_{t=0}^{N-1} f(t) * \{\cos(2\pi\omega t/N) + i\sin(2\pi\omega t/N)\}$$

$$= \frac{1}{N}\sum_{t=0}^{N-1} f(t) * \cos(2\pi\omega t/N) +$$

$$i\frac{1}{N}\sum_{t=0}^{N-1} f(t) * \sin(2\pi\omega t/N)$$

$$= \text{Re}(\omega) + \text{Im}(\omega)$$

In this expression, ω is angular frequency, t is time (index of each pixel), f(t) is the pixel value at t, N is the number of samples (the number of object pixels), and i is the imaginary unit.

For example, in the case of the sample image used to obtain the result shown in FIG. 4, ω=0, 1, ..., 73, 74, and t=0, 1, ..., 73, 74 (N (the number of samples)=75).

The power spectrum is expressed by $$S(\omega) = Re^2(\omega) + IM^2(\omega) \quad \text{(Expression 2)}$$

Figure 5:
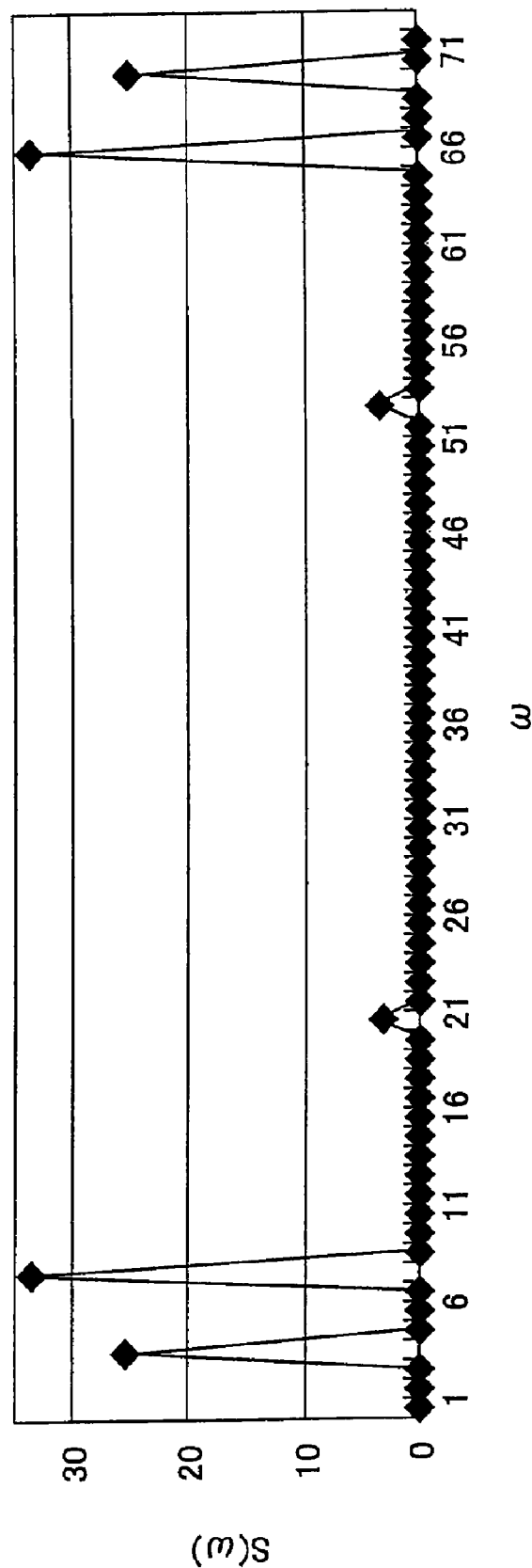
FIG. 5 is a diagram showing a power spectrum in the case of the sample image.

The power spectrum in the case of the sample image used to obtain the result shown in FIG. 4 is as shown in FIG. 5.

Then, the less contributive frequency band(s) is cut in step 204, and the process proceeds to step 206. Specifically, only the frequency band(s) (ω) that satisfy the relation, S(ω)>the average value of S(ω)), are used. For this purpose, S(ω)) that satisfies the relation, S(ω))<the average value of S(ω)), is set to zero.

Figure 6:
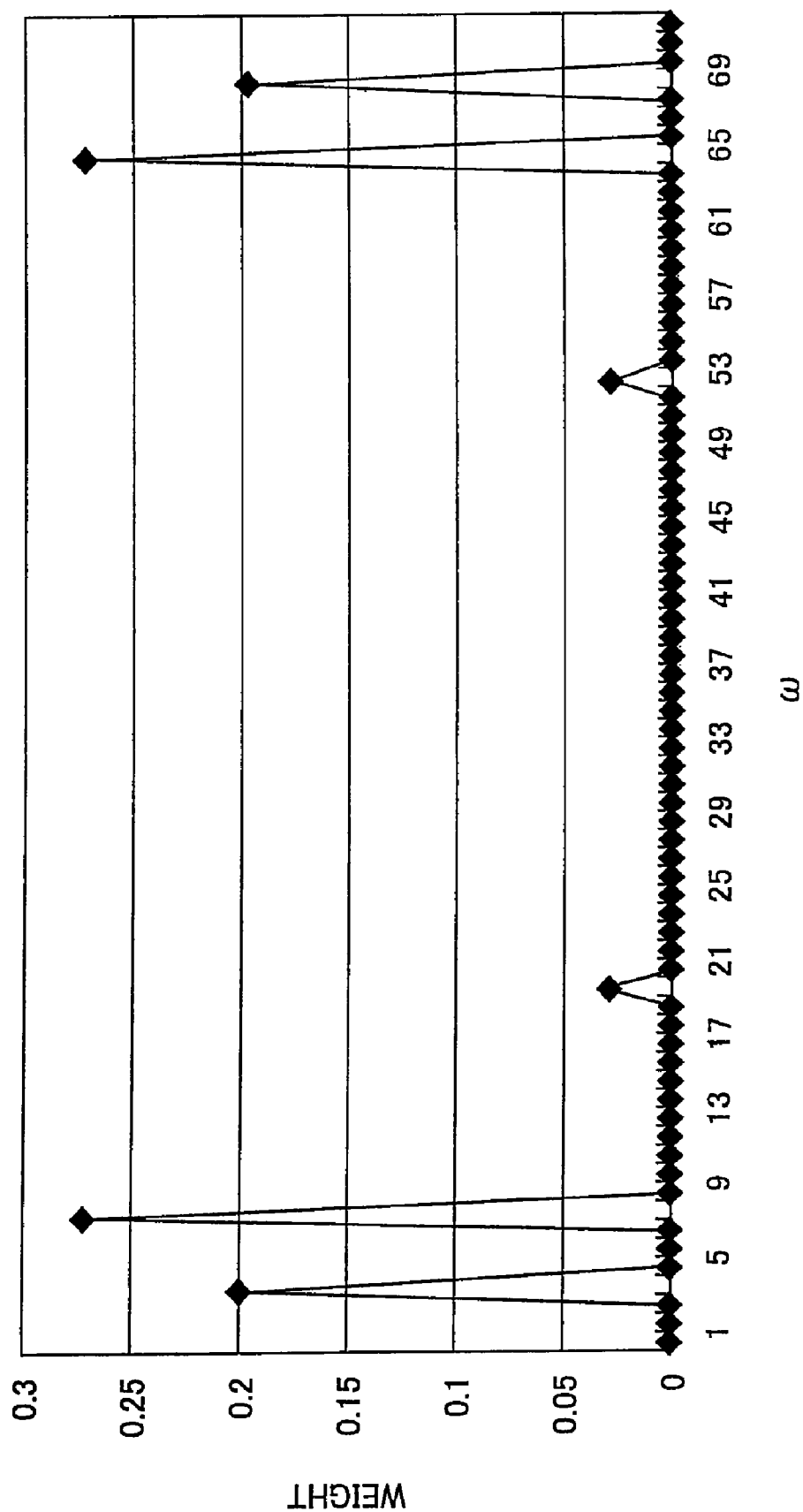
FIG. 6 is a diagram showing a result of determining weights by extracting the frequency components that satisfies the relation, $S(\omega)$>the average value of $S(\omega)$, in the power spectrum of the sample image.

In step 206, inverse transformation (time-series transformation) in which an approximation is made is performed. Specifically, first, weights are calculated so that the sum total with respect to the power spectrum calculated in step 204 becomes one. In this way, it is possible to determine the proportions of the frequencies composing the spectrum. FIG. 6 shows a result of determining the weights of the power spectrum peaks that satisfy the relation, S(ω)>the average value of S(ω), in the sample image.

Using the fact that the real part of the Fourier transform (frequency domain) is expressed by cosine functions, the weights of the power spectrum peaks are assigned to the real part of the frequency domain function to perform an inverse transformation.

When this technique is used, it is assumed that the number of repetitions of the repeating pattern in the input image is 2×2 or more. In addition, the amplitude of a cosine function takes the maximum value when t=0 in the time domain. Accordingly, the interval between t=0 and $t_{max}$ that is the time t between 0 and N/2 exclusive, and at which the amplitude becomes maximum, is approximately regarded as one period.

In general, the inverse Fourier transform (transformation into a time series) is determined by $$f(t) = \sum_{\omega=0}^{N-1} \tau(\omega) * e^{-i2\pi\omega t/N} \quad \text{(Expression 3)}$$

$$= \sum_{\omega=0}^{N-1} \tau(\omega) * \{\cos(2\pi\omega t/N) - i\sin(2\pi\omega t/N)\}$$

Figure 7:
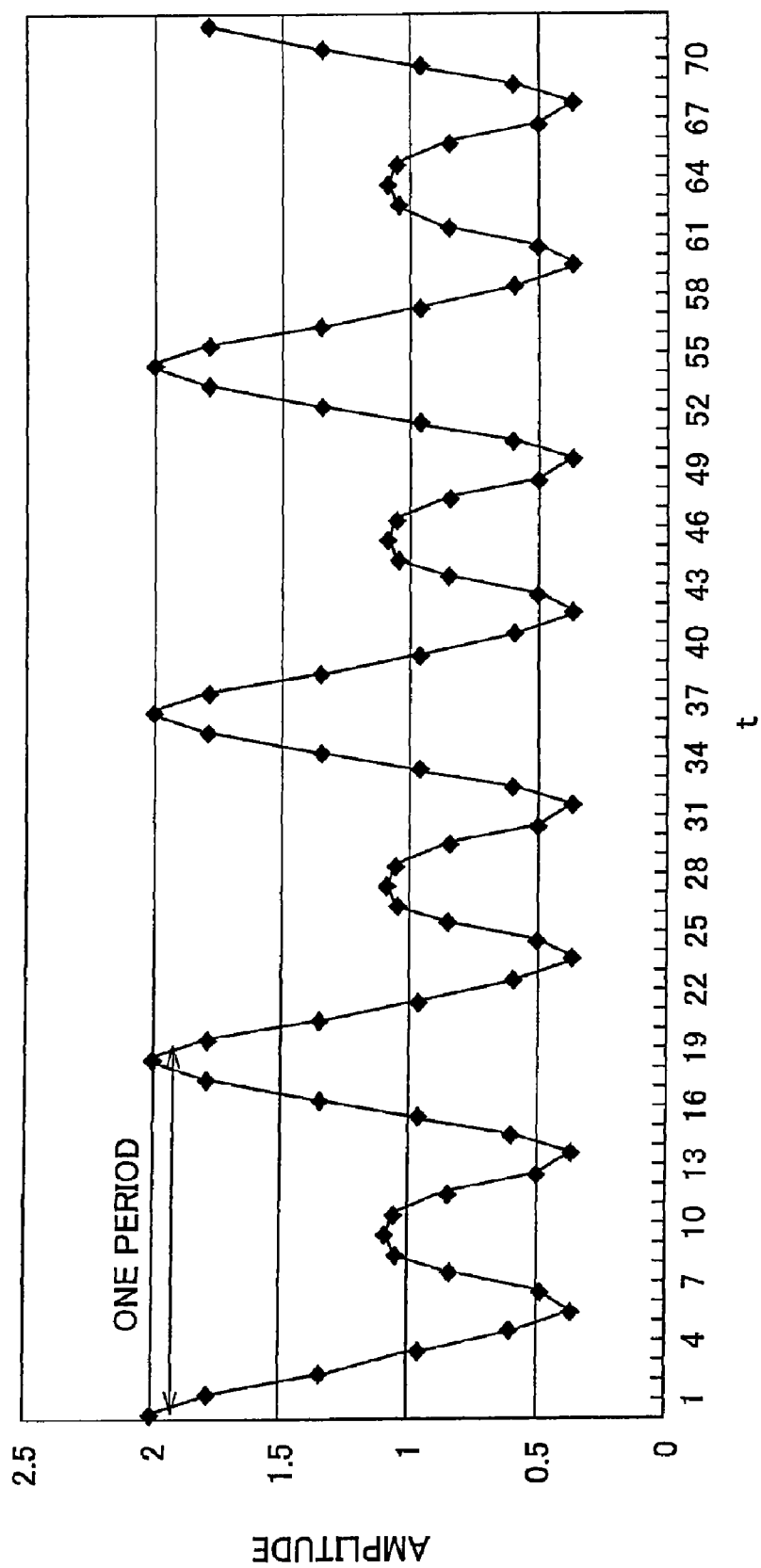
FIG. 7 is a diagram showing a result of performing an inverse transformation of the power spectrum of the sample image into time-domain data.

A result of the inverse transformation in step 206 (a result of transforming the frequency-domain data of the sample image into the time-domain data) is shown in FIG. 7.

Subsequently, the repetition period is determined in step 208, and the process proceeds to step 210. Specifically, the repetition period is determined based on the result obtained using the above-described inverse transformation. The repetition period r is expressed by the equation, $r = t_{max} - 1$ (pixel). For example, in the above-described case of FIG. 7, the repetition period r=17−1=16.

In step 210, a repeating pattern is extracted using the repetition period in the horizontal direction thus obtained, and the repetition period in the vertical direction that is obtained similarly to the repetition period in the horizontal direction.

By determining the repetition period by transforming the pixel values into frequency coefficients, it is possible to automatically extract a repeating pattern.

Figure 8:
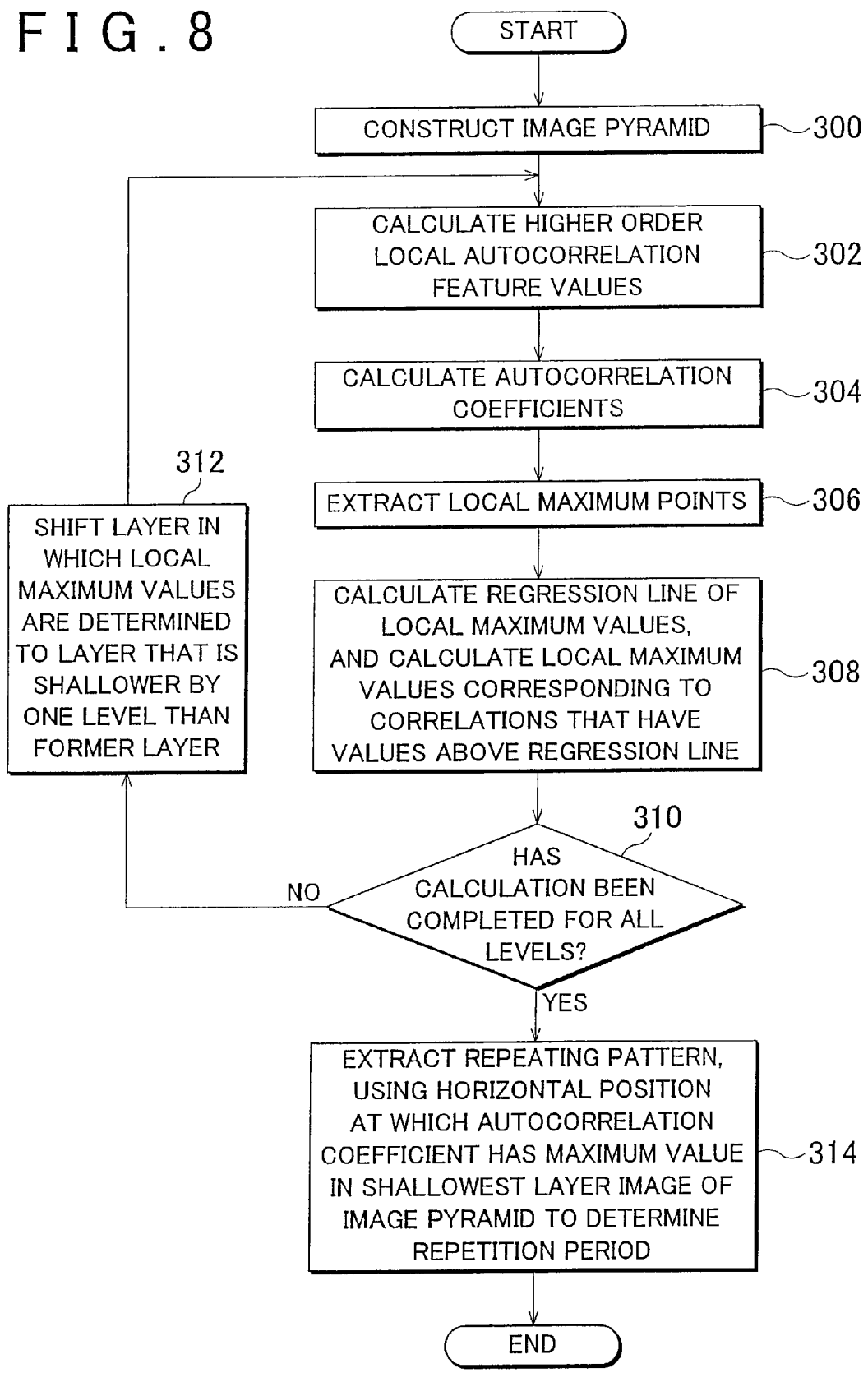
FIG. 8 is a flow chart for explaining a method of determining a repetition period by performing division using local maximum values of the autocorrelation coefficients.

Next, a method of determining a repetition period by performing division using local maximum values of autocorrelation coefficients will be described. FIG. 8 is a flow chart for explaining the method of determining the repetition period by performing division using local maximum values of the autocorrelation coefficients.

Figure 9:
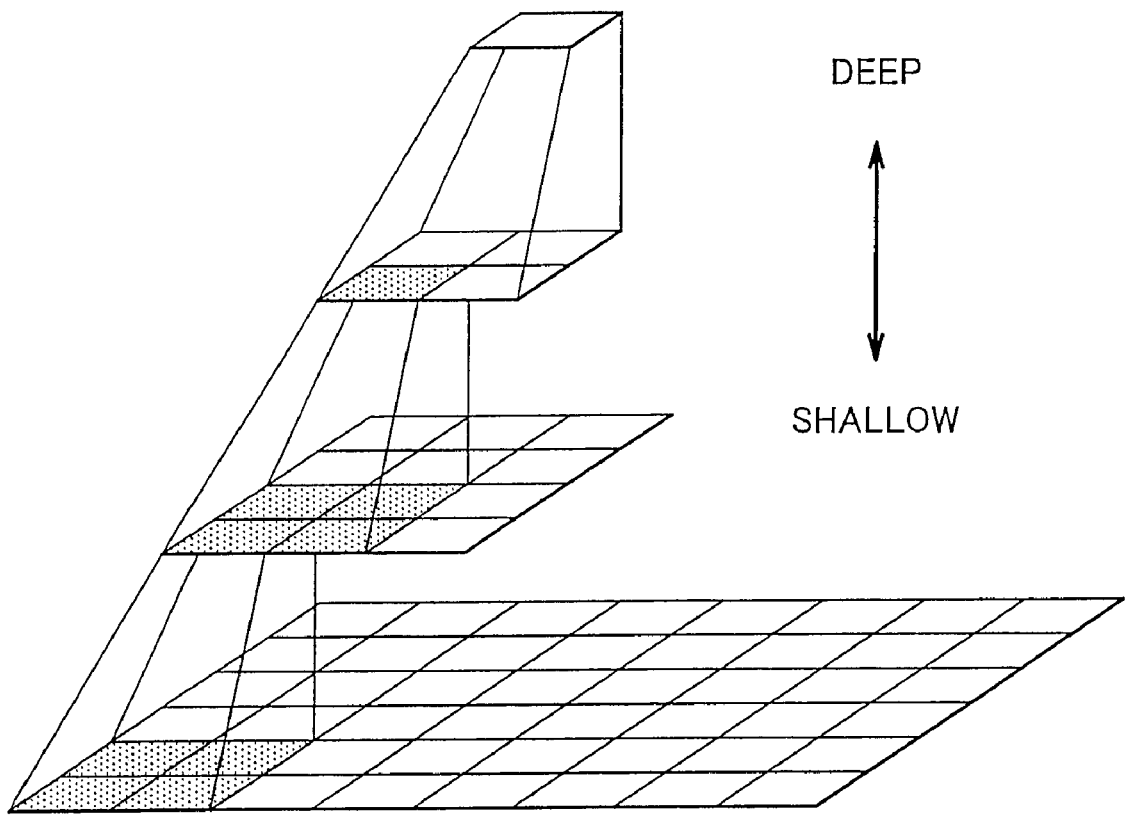
FIG. 9 is a diagram showing the outline of an image pyramid.
Figure 10:
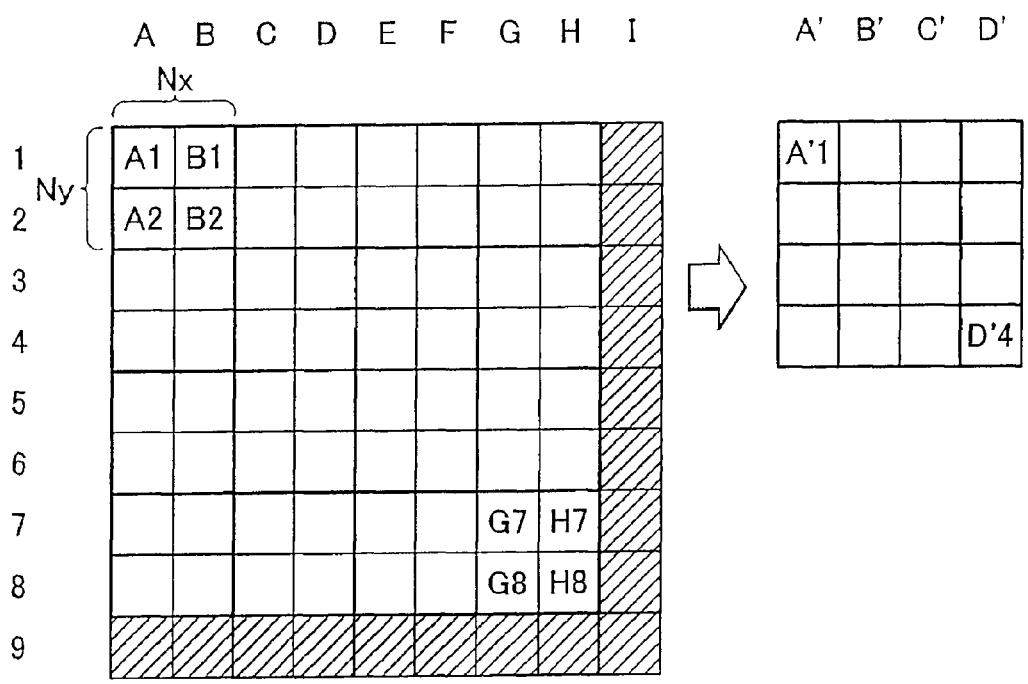
FIG. 10 is a diagram for explaining the image pyramid.

In step 300, an image pyramid is constructed. The image pyramid is constructed as a set of images with different resolutions, from a high resolution image to a low resolution image. In order to construct the image pyramid, as shown in FIG. 9, the input image is divided into small areas that have no overlap, and each small area is replaced by the average value of the pixel values in the small area. This process is repeated to construct the image pyramid. Specifically, as shown in FIG. 10, when an image pyramid is constructed for the image with 9×9 pixels, the layer that is lower (deeper) by one level in the pyramid is represented by the values each being the average of the pixel values of Nx×Ny pixels. For example, as shown in FIG. 10, in the layer that is lower by one level in the pyramid, A'1=(A1+B1+A2+B2)/(Nx×Ny), D'4=(G7+H7+G8+H8)/(Nx×Ny). Nx is the number of pixels in the X direction whose pixel values are summed when the layer that is lower by one level in the pyramid is created, and Ny is the number of pixels in the Y direction whose pixel values are summed when the layer that is lower by one level in the pyramid is created. In the case of FIG. 10, Nx=Ny=2, and the pixels of $A_9$, $B_9$, $C_9$, $D_9$, $E_9$, $F_9$, $G_9$, $H_9$ and $I_1$ to $I_9$ are therefore not used.

When the features based on the higher order local autocorrelation are extracted from the images constituting the image pyramid, the set of the features includes information ranging from specific information to rough information of the object(s). The invariance to translation of the object(s) is inherited by the features. Accordingly, these features are considered to be good initial features as a whole.

In step 302, a higher order local autocorrelation features are calculated. The calculation of the higher order local autocorrelation features will now be described. It is known that an autocorrelation function is invariant to translation. An extension of the autocorrelation function to a higher order one is the higher order autocorrelation function.

When an object in the image is represented by f(r), the Nth-order autocorrelation function is defined by $$x^N(a_1, a_2, \ldots, a_N) = \int f(r)f(r+a_1)\ldots f(r+a_N)dr \quad \text{(Expression 4)}$$

with respect to the displacements ($a_1, a_2, \ldots, a_N$). Thus, there can be an infinite number of higher order autocorrelation functions depending on the order and the displacements adopted. However, in order to satisfy the conditions of additivity with regard to the screen, the displacements have to be limited to a local area around the reference point r.

Figure 11:
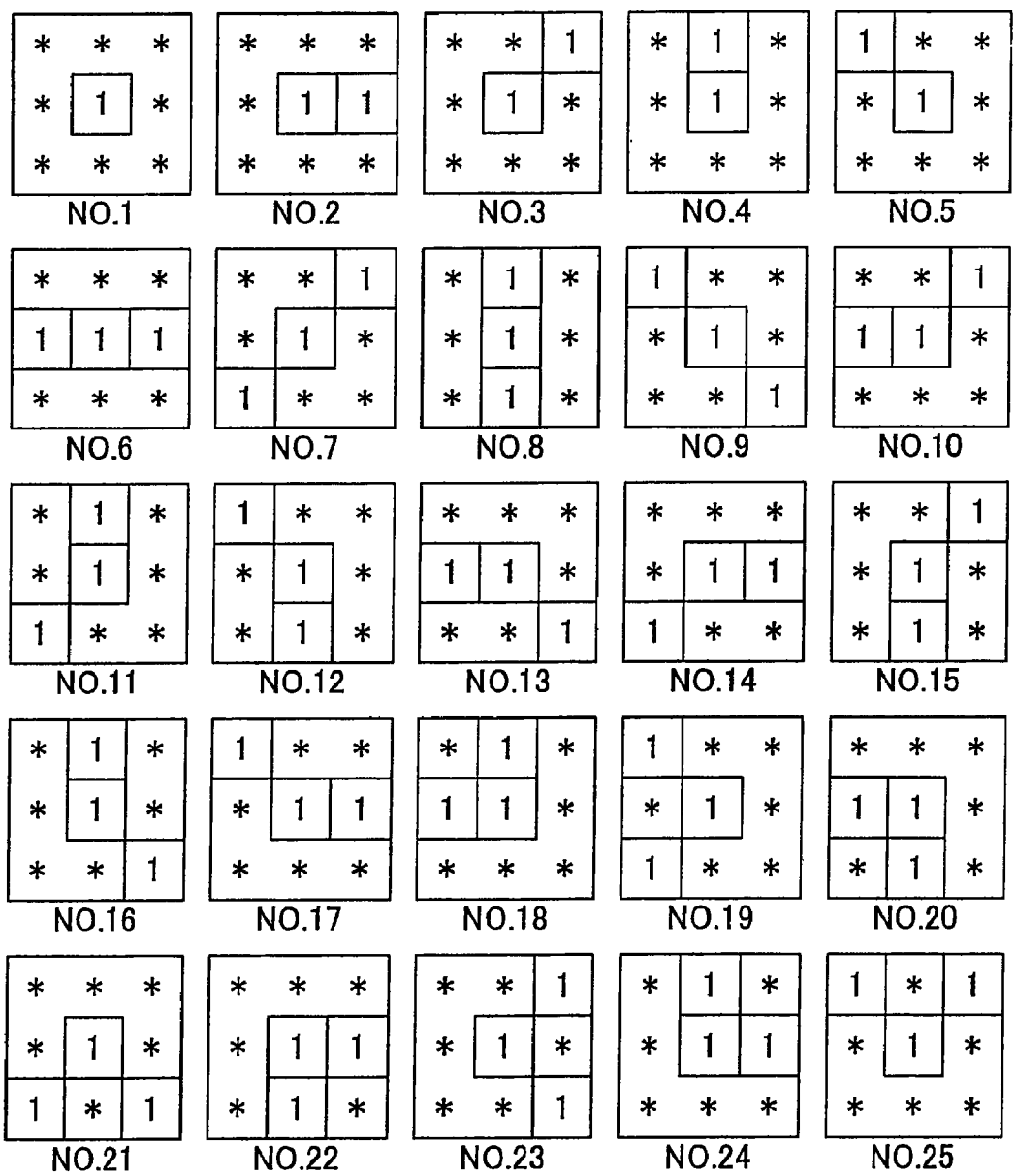
FIG. 11 shows 25 local patterns used to calculate higher order local autocorrelation features.

For the sake of simplicity, the order N of the higher order autocorrelation function is limited to at most two. In addition, the displacements are limited to the local 3×3 pixel area around a reference point r. In this case, when the features that are equivalent under translation are excluded, the number of features are 25 in total with regard to binary images. FIG. 11 shows 25 local patterns of the higher order local autocorrelation features.

Calculation of the features can be carried out by calculating the product of the pixel values of the pixels corresponding to a local pattern in each local area, and summing the products over the entire image. For example, the feature corresponding to the local pattern No. 2 shown in FIG. 11 is calculated by calculating the product of the gray value of a reference point and the gray value of the right adjacent pixel thereof in each local area, and summing the products over the entire image.

The features thus calculated are obviously invariant to translation of the object(s), and satisfy the conditions of additivity with respect to the image.

Figure 12:
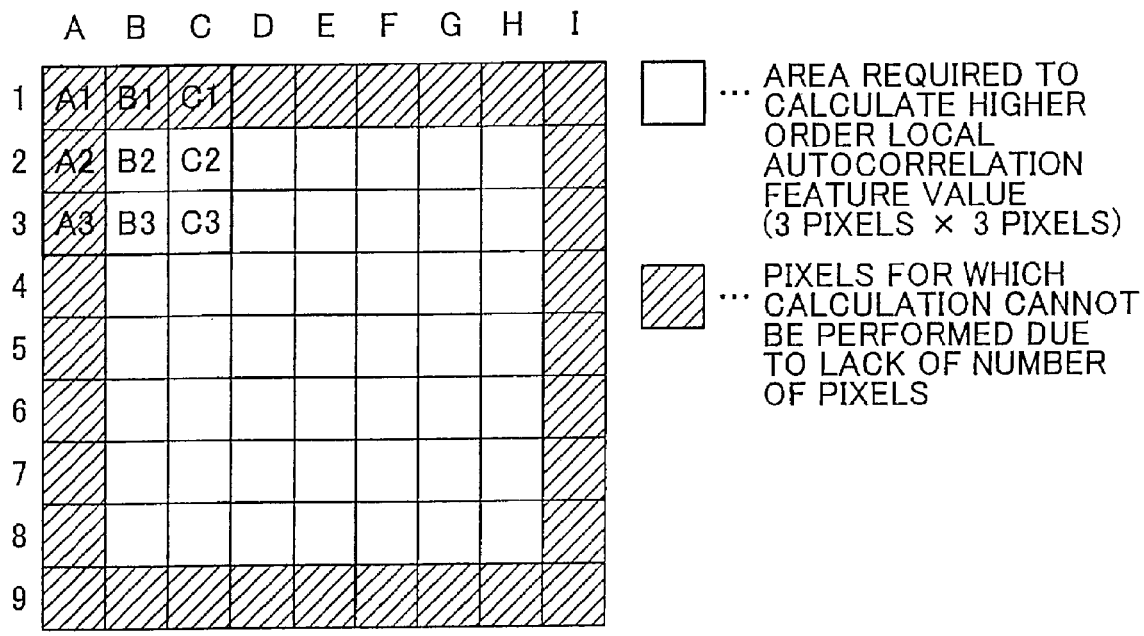
FIG. 12 is a diagram showing an example of calculating a higher order local autocorrelation feature value.

Hence, the higher order local autocorrelation feature value (hereinafter also referred to simply as "the feature value") is calculated for each pixel of the deepest layer (smallest) image of the image pyramid. As shown in FIG. 12, for example, the higher order local autocorrelation function with respect to the reference point B2 is B2+B2*C2+C1*B2+B1*B2+A1*B2+ . . . +B1*B2*C2+A1*C1*B2.

Next, in step 304, autocorrelation coefficients are calculated. Calculation of the autocorrelation coefficients is performed as follows.

When a series of samples $\{x_i: i=1, \ldots, N\}$ conforming to a probability distribution is given, the sample mean is defined as $$\bar{x} = \frac{1}{N}\sum_{i=1}^{N} x_i \quad \text{(Expression 5)}$$

The sample variance is defined as $$\sigma^2 = \frac{1}{N}\sum_{i=1}^{N} (x_N - \bar{x})^2 \quad \text{(Expression 6)}$$

The mean is an index that represents where the center of the distribution of the stochastic variables is. The variance is an index that represents the extent to which the stochastic variables are dispersed about the mean.

These are typical statistics calculated from a series of samples, and, at the same time, are basic values that are used in many applications in the field of image processing.

The square root of the variance of samples is defined as follows.

$$\sigma = \sqrt{\sigma^2} \quad \text{(Expression 7)}$$

This is called the standard deviation.

The standard deviation is an index that represents whether all the data are concentrated around the mean or are widely dispersed. A smaller standard deviation means that the data are more concentrated about the mean. On the other hand, a greater standard deviation means that the data are more widely dispersed about the mean.

When two series of samples $\{x_i: i=1, \ldots, N\}$, and $\{y_i: i=1, \ldots, N\}$ are given, there is a correlation coefficient, which is a statistic measuring the degree of similarity between the series of samples, and is defined as follows.

$$\rho = \frac{\frac{1}{N}\sum_{i=1}^{N}(x_i - \bar{x})(y_i - \bar{y})}{\sigma_x \sigma_y} \quad \text{(Expression 8)}$$

It should be noted that $\sigma_x$ and $\sigma_y$ are standard deviations of the two series of samples, and that the range of the correlation coefficient $\rho$ is expressed by $-1 \leq \rho \leq 1$. The closer $\rho$ is to $-1$, the lower the degree of similarity is. The closer $\rho$ is to 1, the higher the degree of similarity is.

More specifically, the correlation coefficient is calculated as described below from the feature values calculated in step 302.

Figure 13:
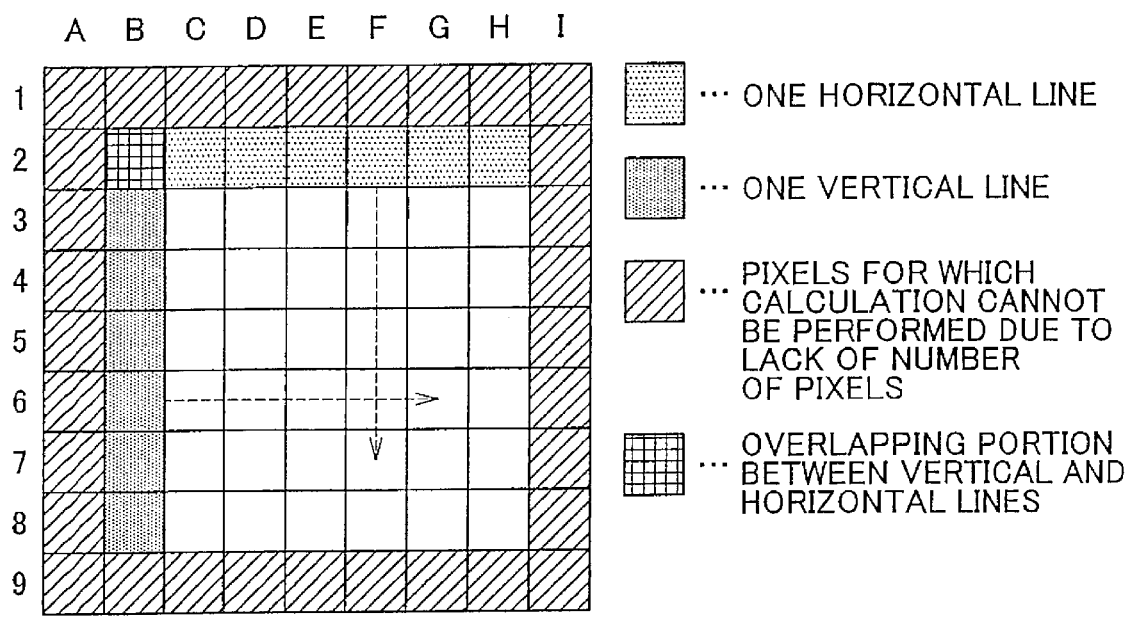
FIG. 13 is a diagram showing an illustration of calculation of the mean, the variance, and the standard deviation of the feature values for each of the horizontal lines and the vertical lines.

First, as shown in FIG. 13, the mean, the variance, and the standard deviation of the feature values are calculated for each of the horizontal lines and the vertical lines. As shown in FIG. 13, the feature values with respect to the upper most pixels and the left most pixels cannot be calculated because of the lack of pixels, and therefore, the feature value with respect to the upper-left most pixel is calculated with a one line (pixel) shift from the upper most line and from the left most line.

Figure 14A:
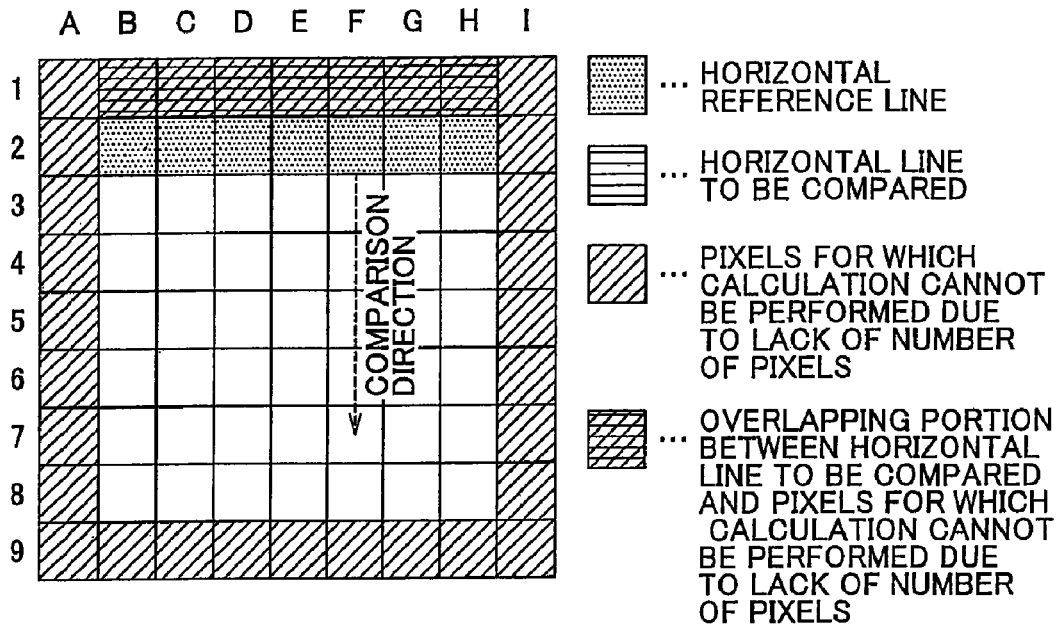
FIG. 14A is a diagram showing an illustration of calculation of the correlation coefficients with respect to the horizontal reference line.
Figure 14B:
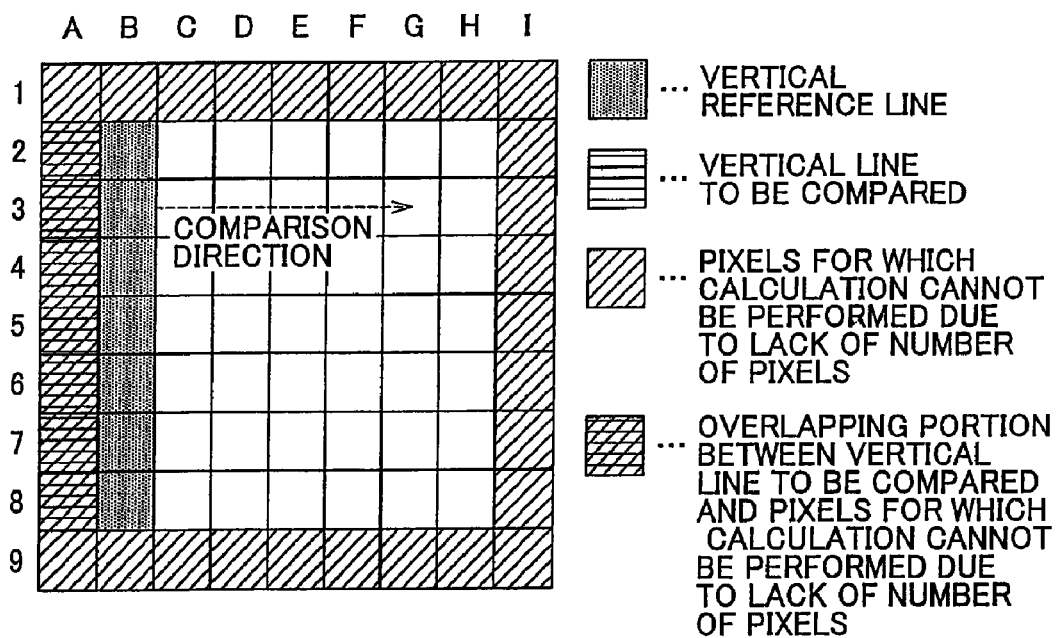
FIG. 14B is a diagram showing an illustration of calculation of the correlation coefficients with respect to the vertical reference line.

Then, as shown in FIGS. 14A and 14B, the correlation coefficients between the vertical reference line and each vertical line, and between the horizontal reference line and each horizontal line, using the calculated feature values. FIG. 14A shows an illustration of calculation of the correlation coefficients with respect to the horizontal reference line. FIG. 14B shows an illustration of calculation of the correlation coefficients with respect to the vertical reference line.

Figure 15A:
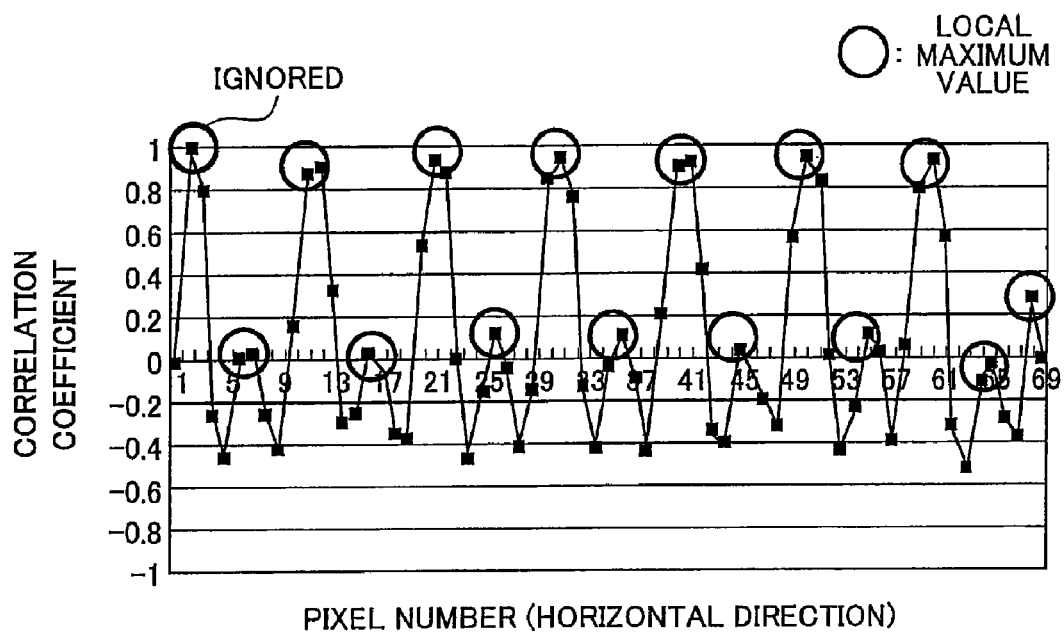
FIG. 15A is a diagram showing a result of calculating correlation coefficients in the horizontal direction.
Figure 15B:
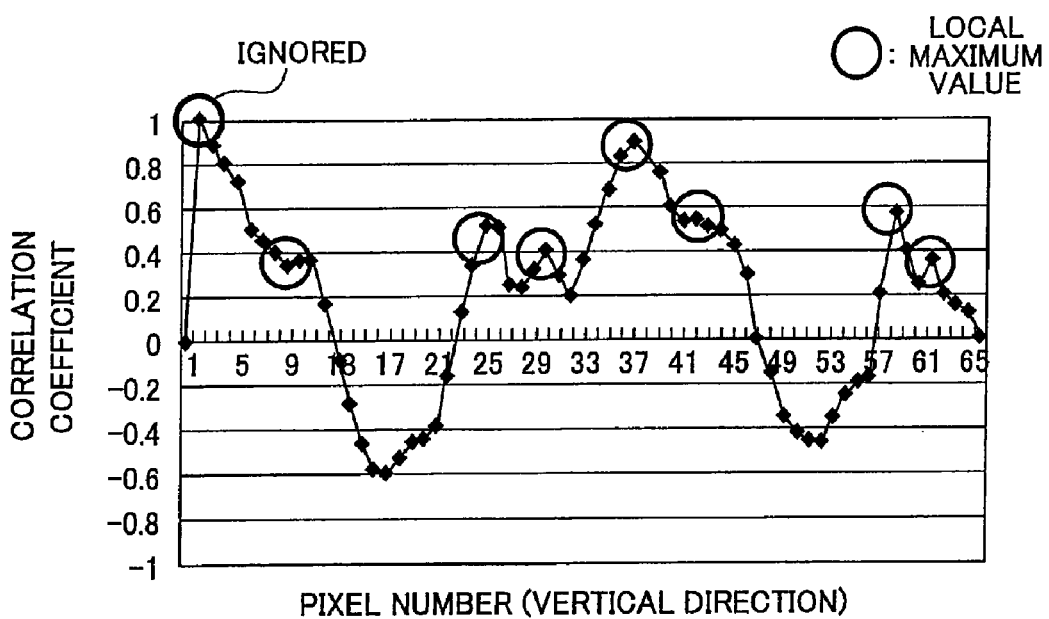
FIG. 15B is a diagram showing a result of calculating correction coefficients in the vertical direction.

After the correlation coefficients are calculated as described above, local maximum points shown in FIGS. 15A and 15B are extracted in step 306, and the process proceeds to step 308. A local maximum point is the point at which the Pixel value (i) satisfies the relations, Pixel value (i−1)<Pixel value (i), and Pixel value (i+1)<Pixel value (i), wherein the Pixel value (i) is the value of the correlation coefficient between the feature values in the reference line and the feature values in the i-th line. FIG. 15A shows a result of calculating the correlation coefficients in the horizontal direction. FIG. 15B shows a result of calculating the correlation coefficients in the vertical direction. It should be noted that, with regard to the nearest line to the reference line, the correlation to the reference line is naturally high, and the local maximum point of the correlation coefficient corresponding to this line is therefore ignored in the following process.

Figure 16A:
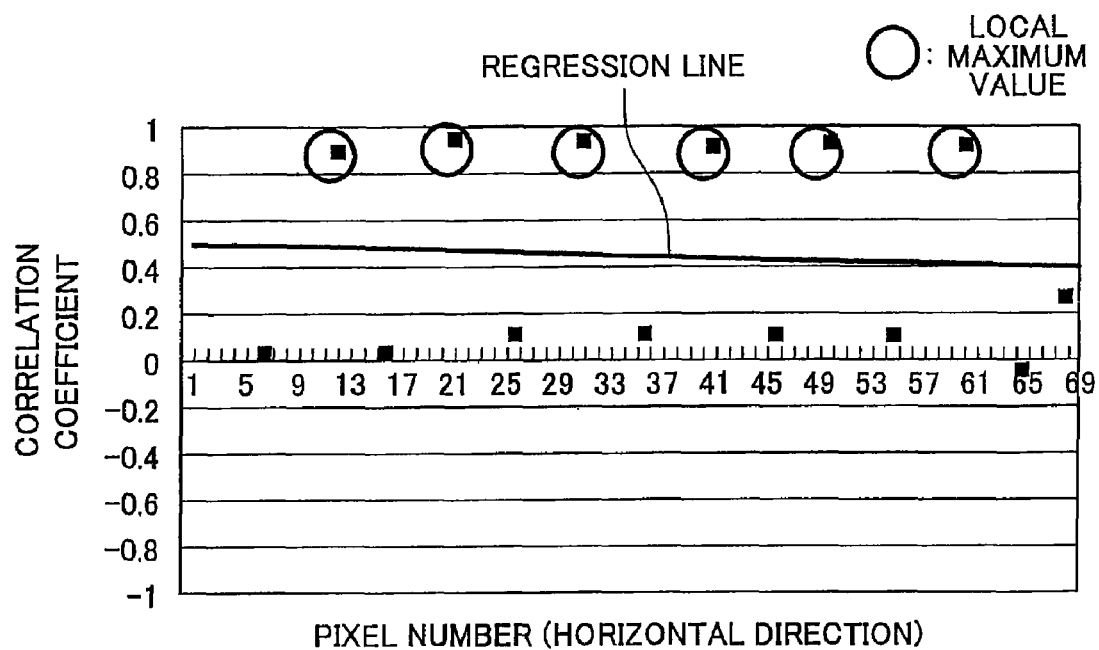
FIG. 16A is a diagram showing a regression line of the local maximum points shown in FIG. 15A.
Figure 16B:
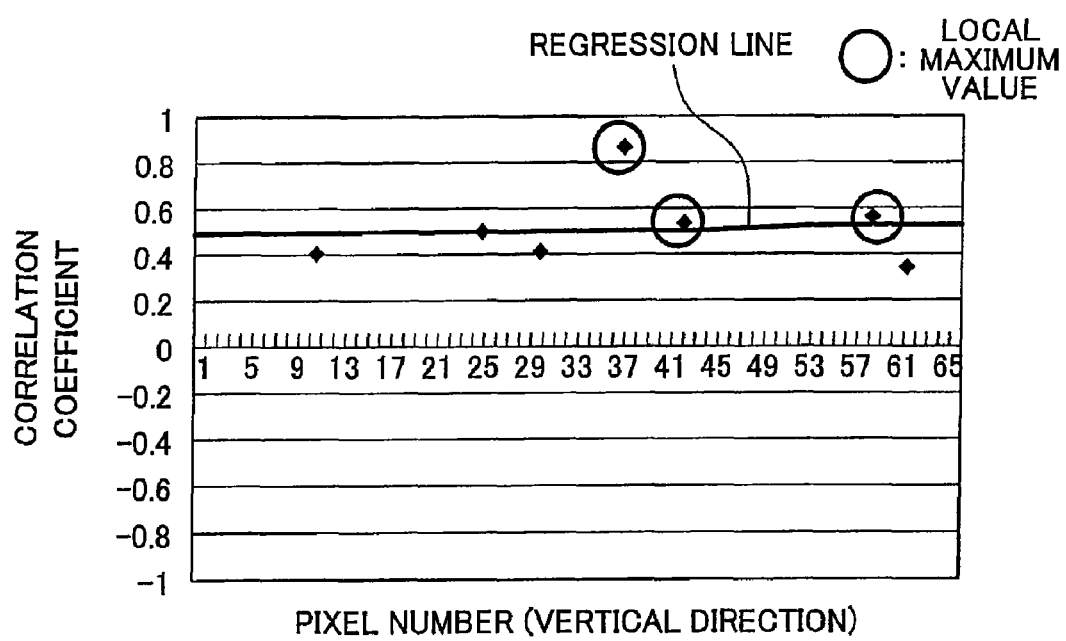
FIG. 16B is a diagram showing a regression line of the local maximum points shown in FIG. 15B.

In step 308, the regression line of the local maximum points, that is, the local maximum values is calculated, and the local maximum values corresponding to the correlations that have values above the regression line as show in FIGS. 16A, 16B are determined. Then, the process proceeds to step 310, and the search is repeated for a shallower layer of the image pyramid. That is, in step 310, it is determined whether calculation of the local maximum values with respect to the shallowest layer has been performed. When the determination is negative, the level in the image pyramid is shifted to a level that is shallower than the former by one level, and the process returns to step 302 to repeat the above process. When the determination in step 310 is positive, the process proceeds to step 312.

In step 312, as shown in FIG. 16B, a repeating pattern is extracted using the position of the line at which the autocorrelation coefficient has the maximum value in the shallowest layer image of the image pyramid to determine the repetition period.

Hence, it is possible to automatically extract a repeating pattern also by determining the repetition period by performing division using local maximum values of autocorrelation coefficients.

When the method of determining a repetition period by transforming the pixel values into frequency coefficients, the Fourier transform and the inverse Fourier transform are used. If the number of repeating patterns is small, it is tried to associate cosine waves with the pixel values of the unperiodic image using an inverse Fourier transform, there is a case where it is impossible to determine the repetition period However, when the number of repeating patterns is small, using the method of determining the repetition period by performing division using local maximum values of autocorrelation coefficients makes it possible to accurately extract a repeating pattern.

Figure 17:
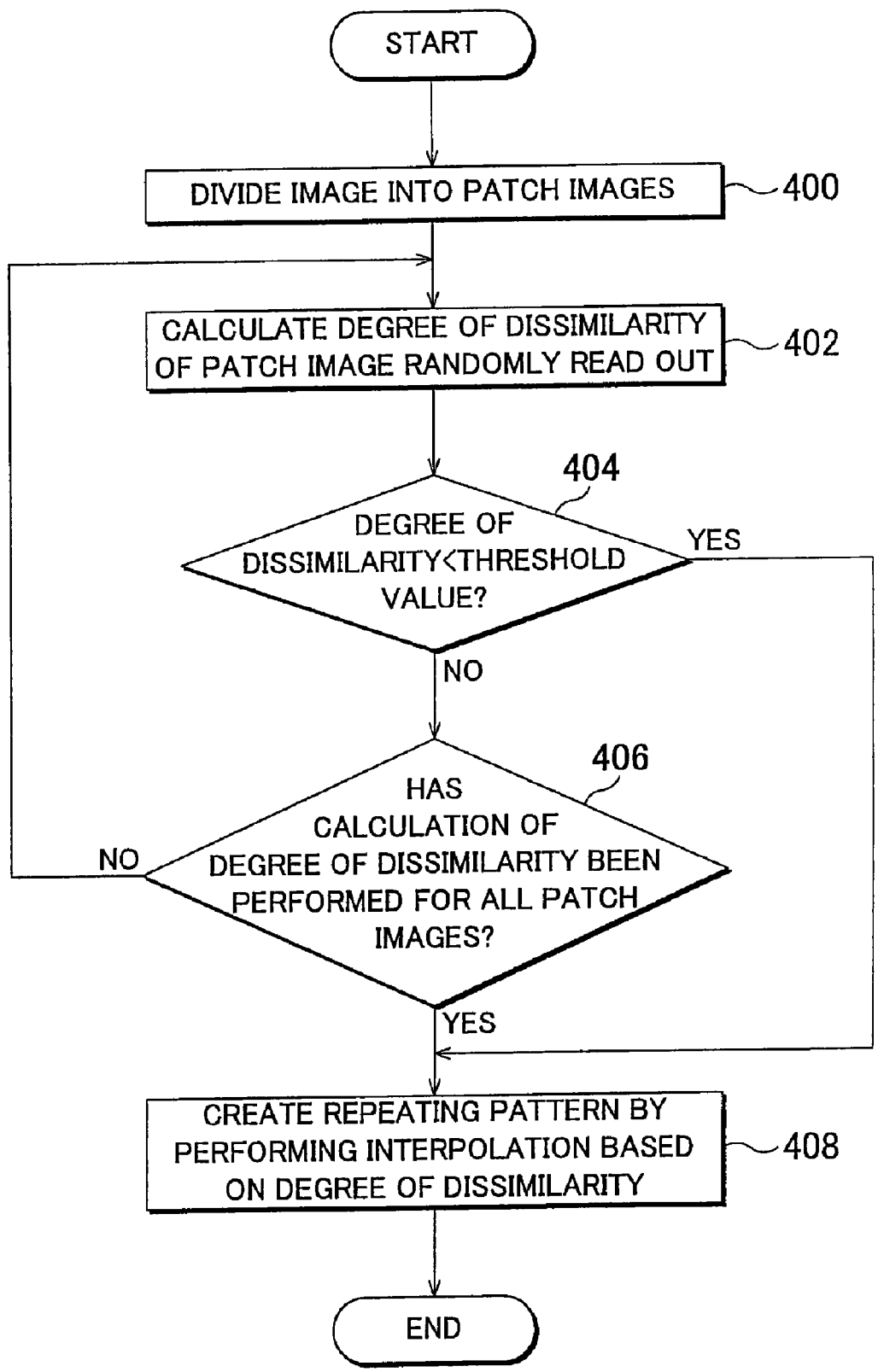
FIG. 17 is a flow chart for explaining a method of creating a random repeating pattern by performing division of an image into patch images.

The above-mentioned method of creating a random repeating pattern using a process of dividing an image into patch images will now be described. FIG. 17 is a flow chart for explaining the method of creating a random repeating pattern using the process of dividing an image into patch images.

Before explaining the flow chart shown in FIG. 17, an outline of the method of creating a random repeating pattern using the process of dividing an image into patch images will be described.

In this embodiment, when no repeating pattern is present in the input image, the input image is divided into a plurality of patch images, one patch image is randomly selected as the patch image to be placed from among the plurality of patch images, and the selected patch image is placed. Then, the plurality of patch images into which the input image is divided are searched for a patch image that has an edge portion similar to an edge portion of the already placed patch image, and the found patch image is placed so as to overlap the patch image by predetermined pixel lines that has already been placed. Similarly, a patch image having a similar edge portion is searched for, and placed so as to overlap the already placed patch image by the predetermined pixel lines one after another, whereby a repeating pattern is created. For example, first, a patch image that is randomly selected is placed at the upper left position of the image. Then, a patch image whose left edge portion is similar to a right edge portion of the patch image placed at the upper left position is searched for from among randomly selected patch images, and is placed so as to overlap the already placed patch image. Such a search is conducted based on the degree of similarity, and the found patch image is placed one after another, whereby a row of patch images is disposed. When the next row of patch images is disposed, first, a patch image whose upper edge portion is similar to a lower edge portion of the left most patch image already placed is searched for from among randomly selected patch images, and is placed so as to overlap the already placed patch image. When the next adjacent patch image is searched for, a patch image whose upper and left edge portions are similar to lower and right edge portions, respectively, of the already placed patch images is searched for from among randomly selected patch images, and is placed so as to overlap the already placed patch image one after another, whereby a repeating pattern is created.

Figure 18:
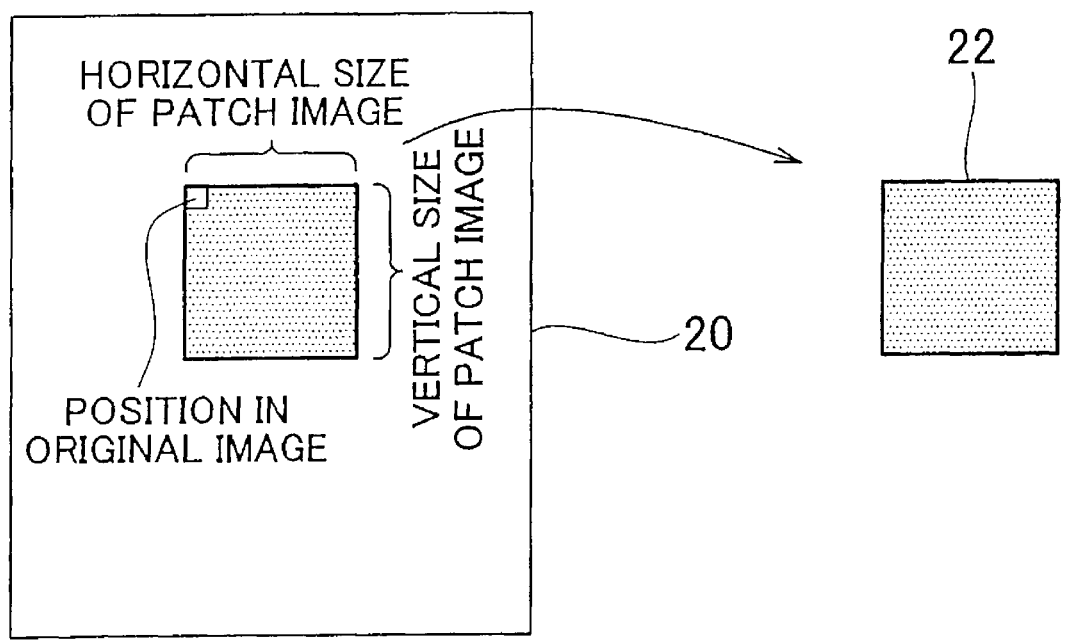
FIG. 18 is a diagram for explaining the division of an original image into patch images.

Specifically, first, in step 400, the image input to the image processing system 10 is divided into patch images with a predetermined size. In order to divide the image into patch images, each pixel is scanned for reference pixels in the input image, and an area, extended from a reference pixel, whose size is (predetermined pixels)×(predetermined pixels) is defined as a patch image, and the input image is divided into a plurality of patch images so that every pair of adjacent patch images overlap each other. The input image is divided so that all the patch images prepared by dividing the input image into the patch images have the same predetermined size, and that the size of patch images does not differ near the edge of the input image. In addition, in order to reduce the memory usage, division of the input image into patch images is performed not by preparing the patch images themselves, but by specifying the position and the size of the patch images in the input image to obtain the patch images. For example, the image processing system is designed so that, by specifying the position and the vertical and horizontal sizes of the patch image in the original image 20 as shown in FIG. 18, the data of the patch image 22 is read out.

Next, in step 402, a patch image is randomly read out, and the degree of dissimilarity thereof is calculated, and the process then proceeds to step 404. In step 404, it is determined whether the degree of dissimilarity is less than a predetermined threshold value. When the determination is negative, the process proceeds to step 406, and it is determined whether calculation of the degree of dissimilarity has been performed for all the patch images. When the determination is negative, the process returns to step 402, a patch image is randomly read out, and the degree of dissimilarity thereof is calculated. When a patch image whose degree of dissimilarity is less than the predetermined threshold value, that is, a patch image that has certain similarity is found, the process proceeds to step 408. When the degree of dissimilarity of every patch image is not less than the predetermined threshold value, the patch image that has the least degree of dissimilarity is selected, and the process proceeds to step 408.

Specifically, the degree of dissimilarity is calculated by calculating the square error using the following expression.

$$\sqrt{\begin{array}{c}(p_{Repeat}-p_{patch})_R^2+\\(p_{Repeat}-p_{patch})_G^2+(p_{Repeat}-p_{patch})_B^2\end{array}} \quad \text{(Expression 9)}$$

The $P_{Repeat}$ is the pixel value of a pixel of the already placed patch image, and the $P_{patch}$ is the pixel value of a pixel of the randomly selected patch image.

Figure 19A:
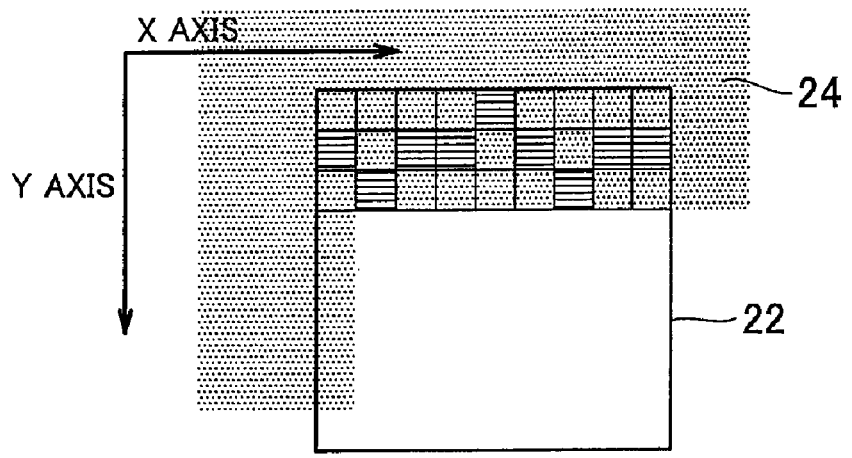
FIG. 19A is a diagram for explaining calculation of the degree of similarity performed when a patch image is placed so as to overlap a lower edge portion of the seamless image.

In this embodiment, when a patch image 22 is placed so as to overlap a lower edge portion of an already placed patch image (hereinafter also referred to as the seamless image 24 in some cases) as shown in FIG. 19A, the square error between the pixel values is calculated at each of the points corresponding to a fixed coordinate x and the respective coordinates y, and the minimum value of the square error is taken, for all the coordinates x in the area in which an upper edge portion of the randomly selected patch image 22 overlaps a lower edge portion of the seamless image 24. FIG. 19A shows a case where the overlapping region consists of three rows of pixels by way of example.

Figure 19B:
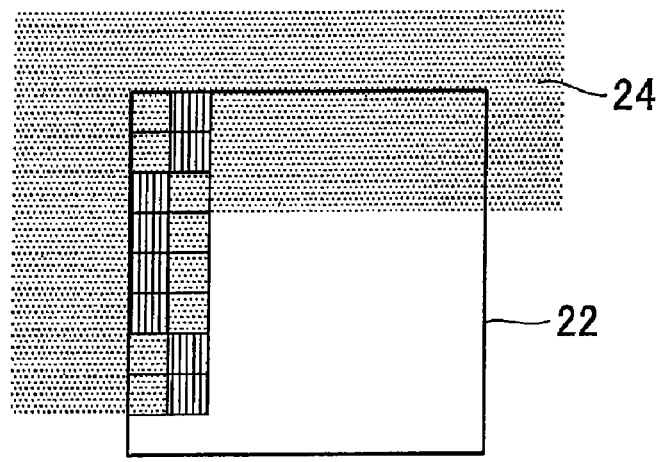
FIG. 19B is a diagram for explaining calculation of the degree of similarity performed when a patch image is placed so as to overlap a right edge portion of the seamless image.

When a patch image 22 is placed so as to overlap a right edge portion of the seamless image 24 as shown in FIG. 19B, the square error between the pixel values is calculated at each of the points corresponding to a fixed coordinate y and the respective coordinates x, and the minimum value of the square error is taken, for all the coordinates y in the area in which a left edge portion of the randomly selected patch image 22 overlaps a right edge portion of the seamless image 24.

Figure 20A:
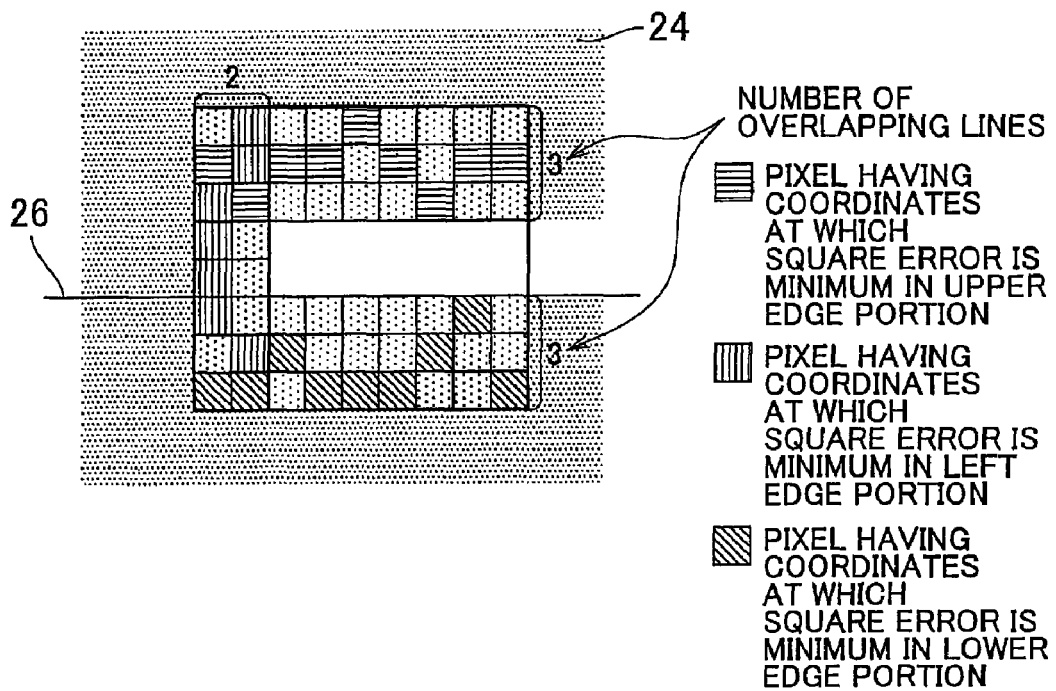
FIG. 20A is a diagram for explaining calculation of the degree of similarity performed when a patch image is placed in a state where the patch image extends beyond the lower edge of the seamless image.

When the patch image 22 that is randomly selected and is to be subsequently placed extends beyond the lower edge 26 (the lower edge of the seamless image 24) of the frame of the repeating pattern that is being created by placing the patch images as shown in FIG. 20A, the square errors between an upper edge portion of the repeating pattern (an upper edge portion of the seamless image), in which portion patch images have already been placed, and a lower edge portion of the randomly selected patch image 22 are calculated similarly to the above case, and the minimum values are taken. When the patch image 22 extends beyond the lower edge of the frame of the repeating pattern, the number of overlapping lines in FIG. 20A is typically set so that the number of overlapping lines on the lower edge side equals to the number of overlapping lines on the upper edge side.

When the patch image 22 that is randomly selected and is to be subsequently placed extends beyond the right edge 26

Figure 20B:
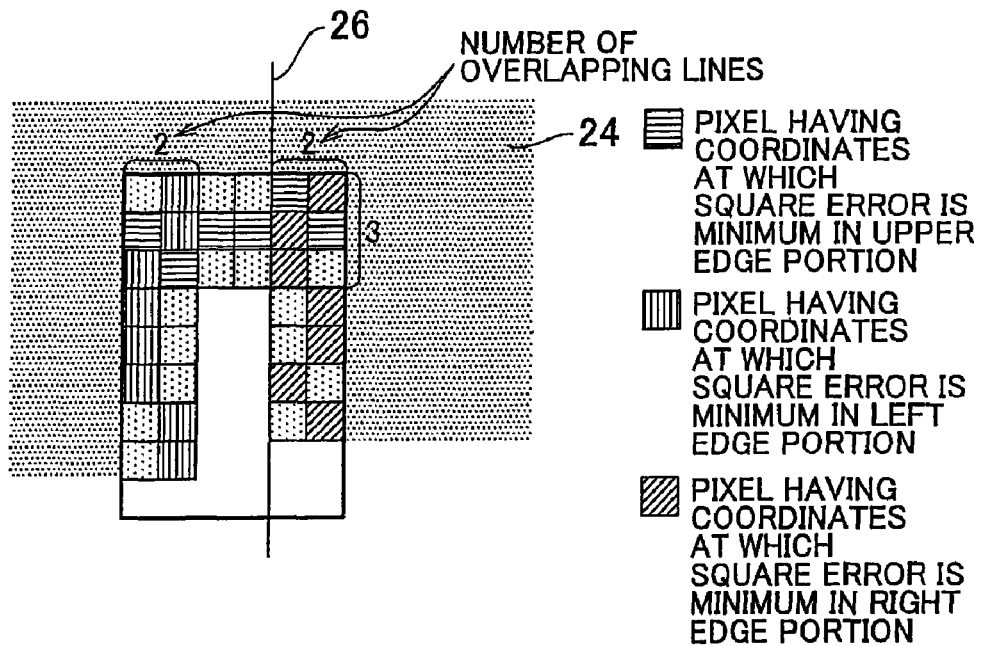
FIG. 20B is a diagram for explaining calculation of the degree of similarity performed when a patch image is placed in a state where the patch image extends beyond the right edge of the seamless image.

(the right edge of the seamless image 24) of the frame of the repeating pattern that is being created by placing the patch images as shown in FIG. 20B, the square errors between a left edge portion of the repeating pattern (a left edge portion of the seamless image), in which portion patch images have already been placed, and a right edge portion of the randomly selected patch image 22 are calculated similarly to the above case, and the minimum values are taken. When the patch image 22 extends beyond the right edge of the frame of the repeating pattern, the number of overlapping lines in FIG. 20B is typically set so that the number of overlapping lines on the right edge side equals to the number of overlapping lines on the left edge side.

In this embodiment, the average of the minimum values of the calculated square errors is calculated, and is used as the degree of dissimilarity. With regard to the area in which the already placed patch images and the randomly selected patch image overlap, the average value of the square errors is calculated for every case with the upper limit of a predetermined pixel number. For example, when the upper limit of the number of rows of pixels in the area in which the already placed patch images and the randomly selected patch image overlap is three, the average value of the square errors is calculated for each of the cases of one to three rows of pixels overlapping, and the minimum average value is taken.

Figure 20C:
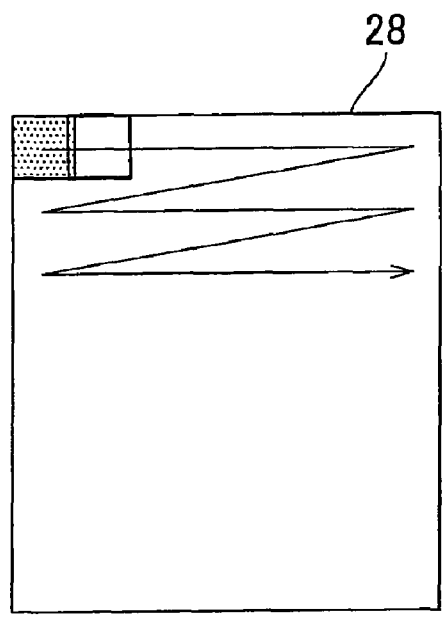
FIGS. 20C and 20D are diagrams each showing an example of the manner in which the patch images are arranged.
Figure 20D:
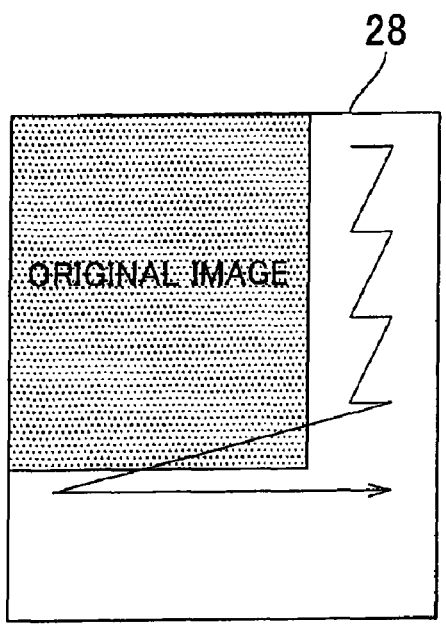

With regard to the method of arranging the patch images when a repeating pattern is created in this embodiment, as shown in FIG. 20C, the patch images may be placed in the order indicated by the arrow from the upper left of the repeating pattern frame 28 without preserving the input image. Alternatively, as shown in FIG. 20D, the original image 20 may be preserved by placing it in the repeating pattern frame 28, and the patch images may be placed in the order indicated by the arrow from the upper left of the vacant portion.

In this way, in the image processing system 10 according to this embodiment, the degree of dissimilarity of the randomly selected patch image to the already placed patch images is calculated, and the patch image with the least degree of dissimilarity is placed so as to overlap the already placed patch images.

Figure 21A:
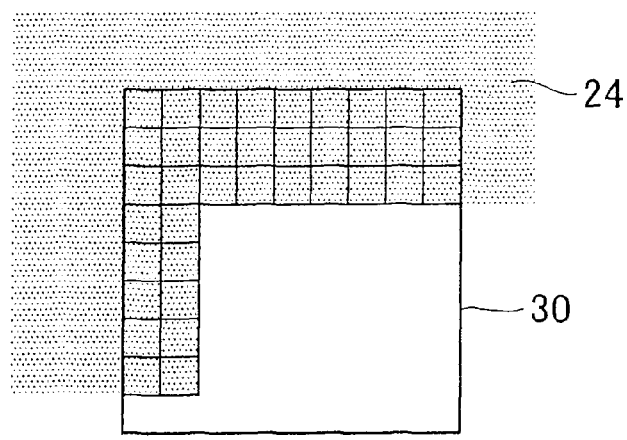
FIG. 21A is a diagram for explaining a patch image to be combined.

In step 408, a repeating pattern is created by performing interpolation based on the degree of dissimilarity. In this embodiment, when a repeating pattern is created by placing the patch images as described above, a patch image having a low degree of dissimilarity is prepared as a patch image 30 to be combined, and is placed so as to overlap the seamless image 24 to combine these images as shown in FIG. 21A.

Figure 21B:
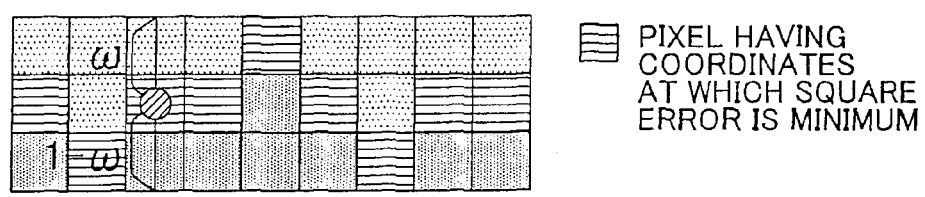
FIG. 21B is a diagram for explaining a process performed for the area in which an upper edge portion of the patch image to be combined overlaps.

Specifically, when the patch image 30 to be combined is placed so that an upper edge portion thereof overlaps the seamless image 24, the pixel value of the pixel on the minus side in terms of the coordinate is set to the pixel value of the corresponding pixel of the seamless image 24, and the pixel value of the pixel on the plus side in terms of the coordinate is set to the pixel value of the corresponding pixel of the patch image in the overlapping, upper edge portion of the patch image 30 to be combined (FIG. 21B). With regard to the combination pixels, the pixel values are calculated using the following expression.

$$P = \varpi P_{patch} + (1 - \varpi) P_{seamless} \quad \text{(Expression 10)}$$

$$\varpi = \frac{\left(\begin{array}{c}\text{value of coordinate } y \text{ of} \\ \text{combination pixel} + 0.5\end{array}\right)}{\text{number of overlapping lines}}$$

Figure 21C:
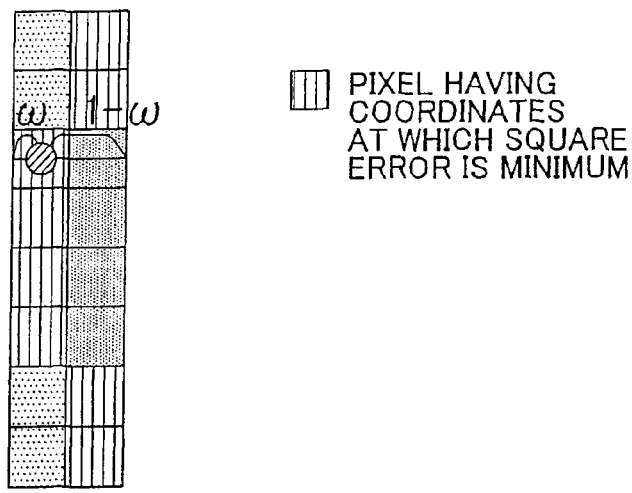
FIG. 21C is a diagram for explaining a process performed for the area in which a left edge portion of the patch image to be combined overlaps.

Also when a patch image 30 to be combined is placed so that a left edge portion thereof overlaps the seamless image 24 (FIG. 21C), the similar process is used.

Figure 22A:
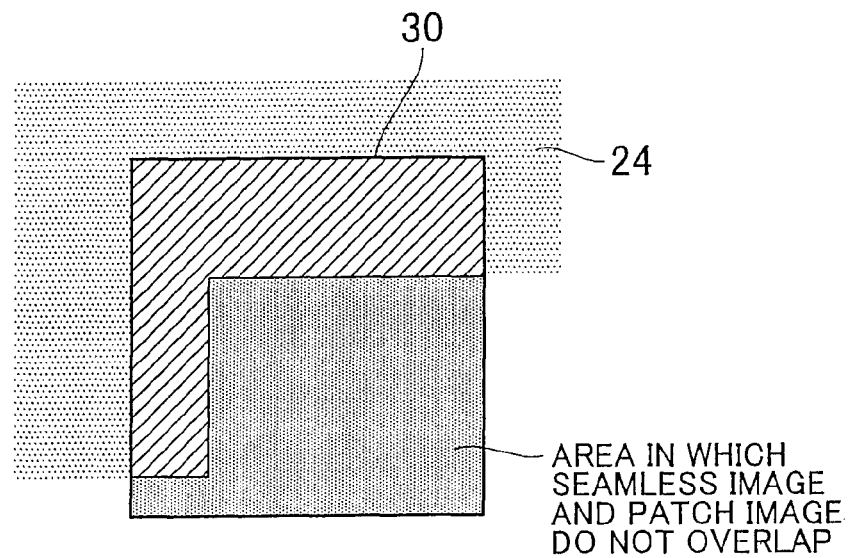
FIG. 22A is a diagram showing an area in which the seamless image and the patch image to be combined do not overlap.

With regard to the area in which the seamless image 24 and the patch image 30 to be combined do not overlap as shown in FIG. 22A, each pixel value is set to the pixel value of the corresponding pixel of the patch image 30 to be combined.

Figure 22B:
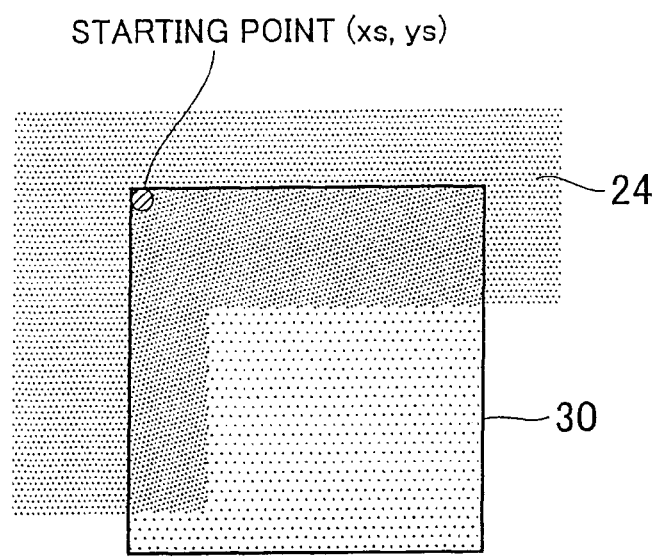
FIG. 22B is a diagram for explaining a method of combining a patch image to be combined.

Thus, as shown in FIG. 22B, a repeating pattern is created by combining a patch image 30 to be combined, with the seamless image 24, using the starting point (xs, ys) as the reference point one after another.

When the patch image 30 to be combined extends beyond the right edge of the frame 26 of the repeating pattern that includes the already placed patch images as shown in FIG. 23A, the projecting portion is combined with a left edge portion of the repeating pattern that includes the already placed patch images. When the patch image 30 to be combined extends beyond the lower edge of the frame 26 of the repeating pattern that includes the already placed patch images as shown in FIG. 23B, the projecting portion is combined with an upper edge portion of the repeating pattern that includes the already placed patch images.

When the above combining process is completed, the completion line is set at the horizontal line corresponding to the minimum vertical coordinate on which line all the pixel values of the pixels have already been determined. In this way, the repeating pattern is created. Thus, unevenness in the vertical direction is eliminated, and it is therefore possible to reduce exception handling during combining images Next, a modification of the image processing system 10 according to the embodiment of the present invention will be described. In the above embodiment, an operator checks the input image displayed on the monitor 12, and determines whether a repeating pattern is present, and whether the number of repetitions of the repeating pattern is 2×2 or more. In this modification, these two determinations are automatically made. The hardware configuration of the image processing system is the same as that of the above embodiment, and detailed description thereof will therefore be omitted.

FIGS. 24A and 24B are flow charts showing an example of the flow of the process, performed by the image processing system of the modification, which includes the extraction process and the creation process described above.

In this modification, in step 500, the process of extracting a repeating pattern from an input image is performed using the above-described method of determining a repetition period by transforming pixel values into frequency coefficients. Then, the process proceeds to step 502.

As described above, in the case where the method of determining a repetition period by transforming pixel values into frequency coefficients, it is in some cases impossible to determine the repetition period when the number of repetitions of the repeating pattern is small, and it is impossible to determine the repetition period when no repeating pattern is present. For this reason, in step 502, it is determined whether a repeating pattern is present in the image. When the determination is negative, the process proceeds to step 504.

In step 504, the process of extracting a repeating pattern is performed using the method of determining a repetition period by performing division using local maximum values of the autocorrelation coefficients described above. Then, the process proceeds to step 506.

In step 506, it is determined whether a repeating pattern is present in the image. When the determination is positive, the process proceeds to step 508. When the determination is negative, the process proceeds to step 510.

In step 508, the repeating pattern extracted using the method of determining a repetition period by performing division using local maximum values of the autocorrelation coefficients is output.

In step 510, a random repeating pattern is created by performing division of the image into patch images described above, and then, the repeating pattern is output.

When the determination in step 502 is positive, the process proceeds to step 512, and it is determined whether the number of repetitions is equal to or greater than 2×2. When the determination is negative, the process proceeds to above-described step 504. When the determination is positive, the process proceeds to step 514.

In step 514, the repeating pattern extracted using the method of determining a repetition period by transforming pixel values into frequency coefficients.

With the modification, by performing the process as described above, when a repeating pattern is present in an input image, it is possible to automatically extract the repeating pattern from the input image, and on the other hand, when no repeating pattern is present therein, it is possible to automatically create a repeating pattern, wherein there is no need for an operator to either determine whether a repeating pattern is present in the input image, or determine whether the number of repetitions of the repeating pattern is 2×2 or more when a repeating pattern is present.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. An image processing system comprising:
a first extracting portion that extracts a repeating pattern from an image by determining a repetition period of the repeating pattern in the image by transforming pixel values in the image into frequency coefficients;
a second extracting portion that extracts the repeating pattern by: constructing an image pyramid that is constructed as a set of images with different resolutions, from a high resolution image to a low resolution image; calculating a higher order local autocorrelation feature value at each pixel of a deepest layer image of the image pyramid to calculate an autocorrelation coefficient between a reference pixel area and each subject pixel area based on the calculated, higher order local autocorrelation feature values; performing such calculation of higher order local autocorrelation feature values and autocorrelation coefficients for an image of a layer that is shallower by one level than the layer of the preceding calculation, wherein, in each repetition, the calculation is performed for every subject pixel area of the current layer that corresponds to the subject pixel area whose autocorrelation coefficient was a local maximum value in the image of the layer that is deeper by one level than the layer of the current layer; repeating the preceding calculation step a predetermined number of times; and using a local maximum value of autocorrelation coefficients of a shallowest layer to determine the repetition period of the repeating pattern in the image; and
a creating portion that creates an arbitrary repeating pattern, wherein: when a repeating pattern whose number of repetitions is equal to or greater than a predetermined number is extracted as a result of extraction of a repeating pattern by the first extracting portion, the repeating pattern extracted by the first extracting portion is output; and when no repeating pattern is extracted by the first extracting portion, or when no repeating pattern whose number of repetitions is equal to or greater than the predetermined number is extracted by the first extracting portion, extraction of a repeating pattern is performed by the second extraction portion, and, if a repeating pattern is extracted by the second extraction portion, the repeating pattern is output, and if no repeating pattern is extracted by the second extracting portion, the arbitrary repeating pattern is created by the creating portion and output.

2. An image processing program product stored in a non-transitory computer readable medium, the image processing program product causing a computer to perform an image-processing process, wherein the image-processing process comprises:
a plurality of steps of extracting a repeating pattern contained in an image, the plurality of repeating pattern-extracting steps using mutually different methods of determining a repetition period; and
a switching step of performing switching between the plurality of repeating pattern-extracting steps according to a number of repetitions of the repeating pattern contained in the image;

wherein the plurality of repeating pattern-extracting steps comprise:
a first extracting step of extracting the repeating pattern by determining a repetition period of the repeating pattern in the image by transforming pixel values in the image into frequency coefficients; and
a second extracting step of extracting the repeating pattern by constructing an image pyramid that is constructed as a set of images with different resolutions, from a high resolution image to a low resolution image;

wherein the second extracting step extracts the repeating pattern at least partially by calculating a higher order local autocorrelation feature value at each pixel of a deepest layer image of the image pyramid to calculate an autocorrelation coefficient between a reference pixel area and each subject pixel area based on the calculated, higher order local autocorrelation feature values; performing such calculation of higher order local autocorrelation feature values and autocorrelation coefficients for an image of a layer that is shallower by one level than the layer of the preceding calculation, wherein, in each repetition, the calculation is performed for every subject pixel area of the current layer that corresponds to the subject pixel area whose autocorrelation coefficient was a local maximum value in the image of the layer that is deeper by one level than the layer of the current layer; repeating the preceding calculation step a predetermined number of times; and using a local maximum value of autocorrelation coefficients of a shallowest layer to determine the repetition period of the repeating pattern in the image.

3. The image processing program product according to claim 2, wherein the image-processing process further comprises:
a creation step of creating an arbitrary repeating pattern, wherein, when no repeating pattern is contained in the image, the creating step creates the arbitrary repeating pattern.

4. An image processing program product stored in a non-transitory computer readable medium, the image processing program product causing a computer to perform an image-processing process, wherein
the image-processing process comprises:
a first extracting step of extracting a repeating pattern from an image by determining a repetition period of the repeating pattern in the image by transforming pixel values in the image into frequency coefficients;
a second extracting step of extracting the repeating pattern by:
constructing an image pyramid that is constructed as a set of images with different resolutions, from a high resolution image to a low resolution image; calculating a higher order local autocorrelation feature value at each pixel of a deepest layer image of the image pyramid to calculate an autocorrelation coefficient between a reference pixel area and each subject pixel area based on the calculated, higher order local autocorrelation feature values; performing such calculation of higher order local autocorrelation feature values and autocorrelation coefficients for an image of a layer that is shallower by one level than the layer of the preceding calculation, wherein, in each repetition, the calculation is performed for every subject pixel area of the current layer that corresponds to the subject pixel area whose autocorrelation coefficient was a local maximum value in the image of the layer that is deeper by one level than the layer of the current layer; repeating the preceding calculation step a predetermined number of times; and using a local maximum value of autocorrelation coefficients of a shallowest layer to determine the repetition period of the repeating pattern in the image; and
a creating step of creating an arbitrary repeating pattern,
wherein: when a repeating pattern whose number of repetitions is equal to or greater than a predetermined number is extracted as a result of extraction of a repeating pattern in the first extracting step, the repeating pattern extracted is output; and
when no repeating pattern is extracted in the first extracting step, or when no repeating pattern whose number of repetitions is equal to or greater than the predetermined number is extracted in the first extracting step, extraction of a repeating pattern is performed in the second extraction step, and, if a repeating pattern is extracted in the second extraction step, the repeating pattern is output, and if no repeating pattern is extracted in the second extracting step, the arbitrary repeating pattern is created in the creating step and output.

5. An image processing method comprising:
performing a first extraction in which a repeating pattern is extracted from an image by determining a repetition period of the repeating pattern in the image by transforming pixel values in the image into frequency coefficients;
when a repeating pattern whose number of repetitions is equal to or greater than a predetermined number is extracted in the first extraction, outputting the repeating pattern extracted in the first extraction;
when no repeating pattern is extracted in the first extraction, or when no repeating pattern whose number of repetitions is equal to or greater than the predetermined number is extracted in the first extraction, performing second extraction in which a repeating pattern is extracted by: constructing an image pyramid that is constructed as a set of images with different resolutions, from a high resolution image to a low resolution image; calculating a higher order local autocorrelation feature value at each pixel of a deepest layer image of the image pyramid to calculate an autocorrelation coefficient between a reference pixel area and each subject pixel area based on the calculated, higher order local autocorrelation feature values; performing such calculation of higher order local autocorrelation feature values and autocorrelation coefficients for an image of a layer that is shallower by one level than the layer of the preceding calculation, wherein, in each repetition, the calculation is performed for every subject pixel area of the current layer that corresponds to the subject pixel area whose autocorrelation coefficient was a local maximum value in the image of the layer that is deeper by one level than the layer of the current layer; repeating the preceding calculation step a predetermined number of times; and using a local maximum value of autocorrelation coefficients of a shallowest layer to determine the repetition period of the repeating pattern in the image;
if a repeating pattern is extracted in the second extraction, outputting the repeating pattern extracted in the second extraction; and
if no repeating pattern is extracted in either the first extraction or the second extraction, creating an arbitrary repeating pattern.

6. An image processing system comprising:
a plurality of portions for extracting a repeating pattern contained in an image, the plurality of repeating pattern-extracting portions using mutually different methods of determining a repetition period; and
a portion for performing switching between the plurality of repeating pattern-extracting portions according to a number of repetitions of the repeating pattern contained in the image;
wherein the plurality of repeating pattern-extracting portions include:
a first extracting portion that extracts the repeating pattern by determining a repetition period of the repeating pattern in the image by transforming pixel values in the image into frequency coefficients; and
a second extracting portion that extracts the repeating pattern by constructing an image pyramid that is constructed as a set of images with different resolutions, from a high resolution image to a low resolution image;
wherein the second extracting portion extracts the repeating pattern at least partially by calculating a higher order local autocorrelation feature value at each pixel of a deepest layer image of the image pyramid to calculate an autocorrelation coefficient between a reference pixel area and each subject pixel area based on the calculated, higher order local autocorrelation feature values; performing such calculation of higher order local autocorrelation feature values and autocorrelation coefficients for an image of a layer that is shallower by one level than the layer of the preceding calculation, wherein, in each repetition, the calculation is performed for every subject pixel area of the current layer that corresponds to the subject pixel area whose autocorrelation coefficient was a local maximum value in the image of the layer that is deeper by one level than the layer of the current layer; repeating the preceding calculation step a predetermined number of times; and using a local maximum value of autocorrelation coefficients of a shallowest layer to determine the repetition period of the repeating pattern in the image.

7. The image processing system according to claim 6, further comprising:
   a creating portion that creates an arbitrary repeating pattern, wherein, when no repeating pattern is contained in the image, the creating portion creates the arbitrary repeating pattern.

* * * * *